United States Patent [19]

Nakahama et al.

[11] Patent Number: 6,111,021
[45] Date of Patent: Aug. 29, 2000

[54] RUBBER COMPOSITION AND PROCESS FOR THE PRODUCTION THEREOF

[75] Inventors: Hidenari Nakahama; Masaaki Kawasaki; Yuji Ishii; Tetsuo Tojo; Taku Koda; Yoshio Maejima; Yuji Miura, all of Ichihara; Yasuhiro Hosomi, Kuga-gun, all of Japan

[73] Assignee: Mitsui Chemicals Inc, Tokyo, Japan

[21] Appl. No.: 08/983,023

[22] PCT Filed: Jul. 5, 1996

[86] PCT No.: PCT/JP96/01865

§ 371 Date: Jan. 2, 1998

§ 102(e) Date: Jan. 2, 1998

[87] PCT Pub. No.: WO97/02316

PCT Pub. Date: Jan. 23, 1997

[30] Foreign Application Priority Data

Jul. 5, 1995 [JP] Japan .................................... 7-170034
Jul. 5, 1995 [JP] Japan .................................... 7-170035
Aug. 28, 1995 [JP] Japan .................................... 7-219243

[51] Int. Cl.$^7$ .................................................... C08L 23/04
[52] U.S. Cl. ......................... 525/232; 525/240; 525/194; 525/197; 525/198
[58] Field of Search ..................................... 525/232, 240, 525/197, 194, 198

[56] References Cited

U.S. PATENT DOCUMENTS 4,311,628  1/1982  Abdou-Sabet et al. ................. 525/232
5,869,563  2/1999  Kawasaki et al. ....................... 524/525

OTHER PUBLICATIONS

Abstract of Jap. Laid–Open Pat. Appln. Publication No. 06–128491 (May 10, 1994).
Abstracts of Jap. Laid–Open Pat. Appln. Publication No. 58–42633 (Mar. 12, 1983).
Abstracts of Jap. Laid–Open Pat. Appln. Publication No. 60–40141 (Mar. 2, 1985).

*Primary Examiner*—Mark L. Warzel

[57] ABSTRACT

A vulcanizable rubber composition comprising a blend which is prepared by micro-dispersing a polyolefin resin (B) in an ethylene-α-olefin-nonconjugated polyene copolymer rubber (A) comprising ethylene, a $C_3$–$C_{20}$ α-olefin and a nonconjugated polyene in a molten state and in which the mean diameter of dispersed particles of the polyolefin resin (B) is 2 μm or below and the (B) to (A) weight ratio ranges from 5/95 to 50/50. The micro-dispersion of a polyolefin resin (B) can easily be attained by kneading the components (A) and (B) together with compounding ingredients (such as reinforcement, filler, softener, vulcanization accelerator, vulcanizing agent and so on) in a rubber kneader, through the resin (B) is essentially difficult of micro-dispersion. Further, the composition enables the provision of rubber articles having a high and constant quality at a low cost, because the resin (B) can well be dispersed by conventional rubber kneaders in a short time without fail. The process for producing the above composition comprises introducing a rubber mixture (E) comprising 100 parts by weight of the copolymer rubber (B) and 3 to 10 parts by weight of an organic solvent (D) into a multi-stage vented extruder through a feed port, while introducing a polyolefin resin (B) thereinto in an inert gas atmosphere through another feed port, kneading the rubber mixture (E) and the polyolefin resin (B) with the removal of the solvent. This process can easily give nonblocking vulcanizable pellets of an ethylenic copolymer rubber composition comprising an ethylene-α-olefin-nonconjugated polyene copolymer rubber (A) and a polyolefin resin (B) wherein the resin (B) is micro-dispersed in a good state.

12 Claims, 3 Drawing Sheets

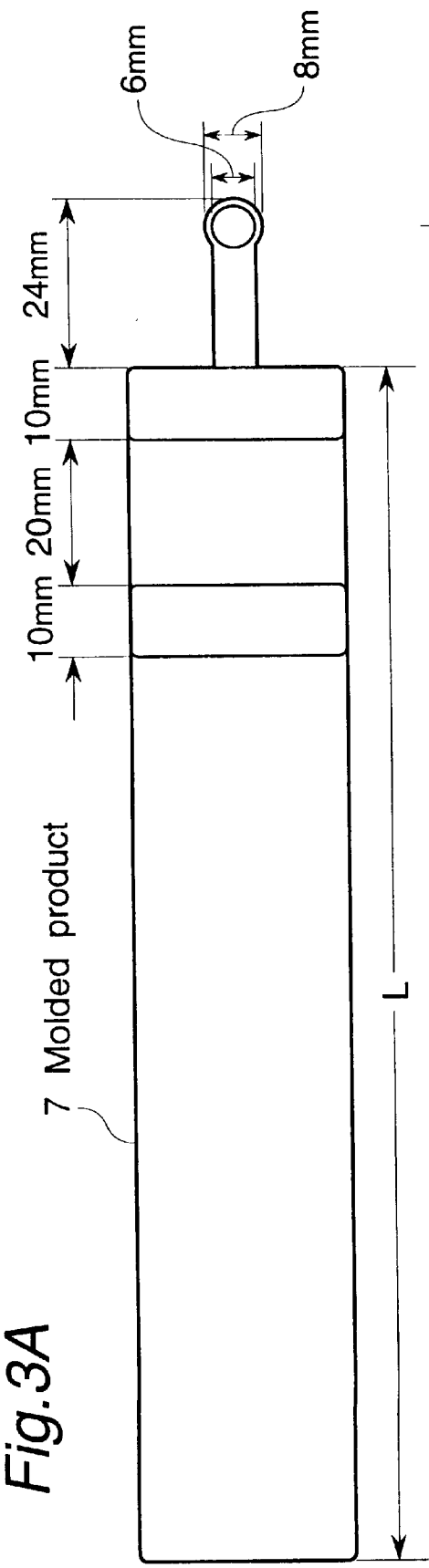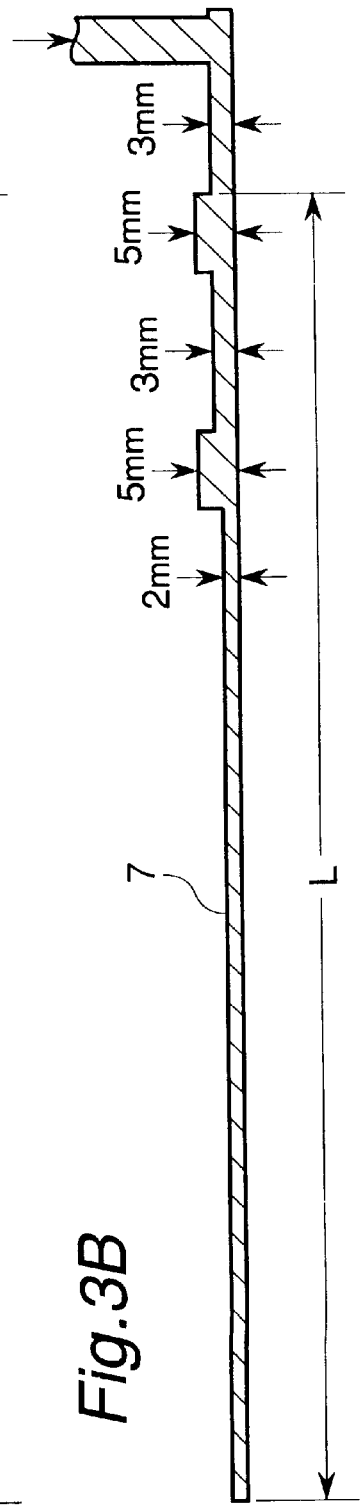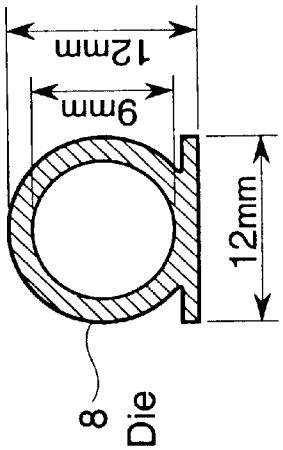
Fig.3A
Fig.3B
Fig.4

RUBBER COMPOSITION AND PROCESS FOR THE PRODUCTION THEREOF

FIELD OF THE INVENTION

The present invention relates to a rubber composition comprising an ethylene/α-olefin/nonconjugated polyene copolymer rubber (EPDM) and a polyolefin resin that is a thermoplastic resin, and also relates to a process for preparing of the composition. More particularly, the invention relates to a raw rubber composition by the use of which a slightly microdispersible polyolefin resin can be readily microdispersed by a rubber kneading machine when the composition is kneaded with compounding ingredients such as reinforcing agents, fillers, softeners, vulcanizing agents and vulcanization accelerators, and also relates to a process for preparing the composition.

BACKGROUND OF THE INVENTION

Because of excellent weathering resistance, ozone resistance and heat resistance of ethylene/α-olefin/nonconjugated polyene copolymer rubbers, they have been broadly used for automobile parts, building materials, electrical wires and industrial parts. In such uses, the ethylene/α-olefin/nonconjugated polyene copolymer rubbers are conventionally kneaded, like other rubbers, with various compounding ingredients such as reinforcing agents (e.g., carbon black), fillers (e.g., talc, clay), softeners, vulcanization accelerators and vulcanizing agents by means of batch type kneading machines such as Banbury mixer or roll, or each kind of extruders to prepare compounded rubbers.

In the preparation of products of the ethylene/α-olefin/nonconjugated polyene copolymer rubbers, polymers each of which has different molecular weight and molecular weight distribution are combined with various compounding ingredients to adjust balance between processability and product property.

The compounded rubbers are generally designed to have their respective compositions according to the hardness of the resulting rubber products. In order to obtain a certain harness, carbon black, talc, clay, silica, calcium carbonate, etc. are used in consideration of balance between cost and product property. The reinforcing agents and the fillers mentioned above exert effects of increasing a product hardness in greater or lesser degrees, but they have nature of decreasing processability of the resulting compounded rubbers because of a rise in the viscosity of the compounded rubbers. Additionally, the reinforcing agents and the fillers also have nature of decreasing extensibility that is an important property of the rubber products.

Other than the reinforcing agents and fillers having such nature as mentioned above, there are known polyolefin resins (e.g., polyethylene) which are used as fillers exerting an effect of increasing a product hardness to almost the same degrees as those carbon black and exhibit an effect of decreasing a viscosity of the compounded rubbers thereby to improve the processability. Polyethylene is practically used in compounding with rubbers.

On the other hand, with respect to polypropylene if the amount thereof is not more than 50 parts by weight based on 100 parts by weight of the total amount of EPDM and polypropylene, the resulting compounded rubber takes a "sea-island structure" wherein the EPDM phase is like a sea and the polypropylene phase is like an island. That is, polypropylene is not blended with EPDM, unlike polyethylene, and therefore polypropylene cannot be usually used as a reinforcing agent for vulcanized rubbers.

Even if a polypropylene/EPDM blend, wherein polypropylene having a mean particle diameter of not more than 2 μm is microdispersed, is prepared by a process comprising the step of melt blending EPDM with polypropylene at a temperature of not lower than the melting point of polypropylene, when employing a step of roll processing, by means of a conventional kneading machine such as a Banbury mixer, which comprises adding carbon black, an oil and a filler to the polypropylene/EPDM blend to prepare a compounded rubber and then adding a vulcanization accelerator and a vulcanizing agent to the compounded rubber with cooling the compounded rubber, as the compounded rubber kept at the kneading temperature is cooled in the roll processing stage, adhesion property of the compounded rubber to the rolls becomes poor. Especially when employing steps which comprise melt blending polypropylene with EPDM at a temperature of not lower than the melting point of polypropylene to obtain a polypropylene/EPDM blend and immediately cooling the polypropylene/EPDM blend with rolls, the compounded rubber does not sufficiently adhere to the rolls, and finally the roll processing becomes impossible. In that case, the Mooney viscosity of the compounded rubber rises too high, whereby a molding process such as extrusion molding, transfer molding or injection molding may become difficult. Further, when the blend is vulcanized, the product hardness, that is a most important property thereof, also rises too high, whereby vulcanized rubber products of the aimed product hardness cannot be obtained.

Polyolefin resins, such as polyethylene and polypropylene, are generally kneaded by kneading machines such as a Banbury mixer, an intermixer and a kneader. In the kneading procedure, the temperature of the kneading machines needs to be raised to not lower than the melting point of the polyolefin resins.

However, these kneading machines are originally designed so that the kneading temperature hardly rises for the purpose of inhibiting burning marks of the compounded rubber during the kneading procedure. Therefore, it was difficult to sufficiently disperse and knead the polyolefin resin compounded, and as a result a problem of poor dispersion of polyolefin takes place. For example, when EPR or EPDM is used for automobile parts after vulcanized, it is sometimes blended with a polyethylene resin, together with a reinforcing agent such as carbon black, to adjust the product hardness. In this blending using a kneading machine such as a Banbury mixer or an intermixer, the polyethylene resin is dispersed insufficiently to cause remaining of agglomerates of the polyethylene resin in the resulting product, whereby bad appearance of the product or lowering of the product property takes place.

The polyethylene resin is generally handled in the form of pellets, and therefore it is unsuitable for the conventional rubber processing equipment provided on the premise of veil handling, for example, some pellets of the polyethylene resin are caught in gaps in the kneading machine and the pellets having been not kneaded are discharged from the kneading machine, whereby bad appearance of the product or lowering of the product property may occur. Accordingly, an improvement in the kneading compatibility of the polyethylene resin pellets with rubbers is desired.

By the way, compositions having ethylene/α-olefin/nonconjugated polyene copolymer rubbers are conventionally known as vulcanizable foaming rubber compositions. Foamed products of the compositions are widely used as sealing materials for automobiles, buildings and electrical appliances. Because of their excellent heat resistance and thermal aging resistance, the foamed products are favorably used as long-life sealing materials.

However, the compositions having the conventional ethylene/α-olefin/nonconjugated polyene copolymer rubbers have low flowability, so that it is difficult to produce large-sized foamed-in place sponges from the compositions.

Accordingly, various studies to produce large-sized foamed-in-place sponges (foamed products) have been made. For example, there is known a method of using a plasticizer in a large amount to improve flowability of the ethylene/α-olefin/nonconjugated polyene copolymer rubber compositions. In this method, however, it is difficult to obtain foamed products of satisfactory strength and modulus, and therefore practically useful large-sized foamed-in-place sponge products can be hardly obtained. A method of using an ethylene/α-olefin/nonconjugated polyene copolymer rubber of high ethylene content has been proposed. In this method, however, sealing properties of the foamed products become insufficient, though the strength of the modulus are improved.

Consequently, now desired is development of a vulcanizable ethylene copolymer rubber composition by the use of which the polyolefin resin can be reliably and sufficiently dispersed for a short period of time by means of a rubber kneading machine conventionally used in the rubber industry, thereby to easily supply rubber products of high and stable quality at a low cost, and development of a process for preparing the rubber composition is also desired. Further, development of a rubber composition capable of producing large-sized foamed products well-balanced balanced among the strength, modulus and sealing properties is also desired.

The present invention is intended to solve such problems associated with the prior art as described above, and it is a main object of the invention to provide a vulcanizable ethylene copolymer rubber composition by the use of which the polyolefin resin can be reliably and sufficiently dispersed for a short period of time by means of a rubber kneading machine conventionally used in the rubber industry, thereby to easily supply rubber products of high and stable quality at a low cost. It is another object of the invention to provide a process for preparing the rubber composition.

SUMMARY OF THE INVENTION

The rubber composition according to the invention is a rubber composition comprising:

an ethylene/α-olefin/nonconjugated polyene copolymer rubber (A) which comprises ethylene, an α-olefin or 3 to 20 carbon atoms and a nonconjugated polyene; and a polyolefin resin (B), wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm; and a blending ratio by weight of the polyolefin resin (B) to the ethylene/α-olefin/nonconjugated polyene copolymer rubber (A), [(B)/(A)], is in the range of 5/95 to 50/50.

One preferred embodiment of the rubber composition of the invention is a rubber composition wherein the polyolefin resin (B) is an ethylene homopolymer or a crystalline ethylene/α-olefin copolymer.

The following rubber compositions (1), (2) and (3) are also preferred embodiments of the present invention, and particularly preferable is a rubber composition wherein the dispersed particles of the polyolefin resin (B) have an aspect ratio of not more than 5. The rubber compositions (1) and (3) are each a vulcanizable rubber composition, and the rubber composition (2) is a vulcanizable foaming rubber composition.

(1) A Rubber Composition Comprising:

an ethylene/α-olefin/nonconjugated polyene copolymer rubber (A) which comprises ethylene, an α-olefin or 3 to 20 carbon atoms and a nonconjugated polyene; and a polyolefin resin (B) which is a crystalline α-olefin homopolymer of an α-olefin of 3 to 8 carbon atoms or a crystalline α-olefin copolymer of the α-olefins, wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50; and the hardness (Y, A hardness defined by JIS K 6301) of the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

(2) A Rubber Composition Comprising:

an ethylene/α-olefin/nonconjugated copolymer rubber (A) which comprises ethylene, an α-olefin or 3 to 20 carbon atoms and a nonconjugated polyene;

a polyolefin resin (B) which is a crystalline α-olefin homopolymer of an α-olefin of 3 to 8 carbon atoms or a crystalline α-olefin copolymer of the α-olefins and has a Vicat softening point of not lower than 130° C.; and a foaming agent (C), wherein:

the rubber composition is a blend obtained by microdispersing the polyolefin resin (B) in the ethylene/α-olefin/nonconjugated copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50;

a blending ratio by weight of the foaming agent (C) to the ethylene/α-olefin/nonconjugated polyene copolymer rubber (A), [(C)/(A)], is in the range of 0.5/100 to 30/100; and the hardness (Y, A hardness defined by JIS K 6301) of the rubber composition and the amount (X) of the polyolefin resin (B) satisfy the following relation:

$$Y=(0.5\pm 0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

(3) A Rubber Composition Comprising:

an ethylene/α-olefin/nonconjugated polyene copolymer rubber (A) which comprises ethylene, an α-olefin or 3 to 20 carbon atoms and a nonconjugated polyene; and a polyolefin resin (B) which is a crystalline α-olefin homopolymer of an α-olefin of 3 to 8 carbon atoms or a crystalline α-olefin copolymer of the α-olefins, wherein:

the rubber composition is a blend obtained by microdispersing the polyolefin resin (B) in the ethylene/α-olefin/nonconjugated copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50; and the hardness (Y, A hardness defined by JIS K 6301) of a non-foamed vulcanized rubber molded product obtained by vulcanizing the rubber composition and the amount (X) of the polyolefin resin (B) satisfy the following relation:

$$Y=(0.5\pm 0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the molded product.

The process for preparing rubber composition according to the invention comprises:

feeding a rubber mixture (E) which comprises 100 parts by weight of an ethylene/α-olefin/nonconjugated polyene copolymer rubber (A) comprising ethylene, an α-olefin of 3 to 20 carbon atoms and a nonconjugated polyene and 3 to 10 parts by weight of an organic solvent (D) to a multi-stage vented extruder through its feed zone;

feeding a polyolefin resin (B) to the extruder through another feed zone in an inert gas atmosphere; and kneading the rubber mixture (E) and the polyolefin resin (B) and desolvating.

In this process, a blending ratio by weight of the polyolefin resin (B) to the ethylene/α-olefin/nonconjugated polyene copolymer rubber (A) in a raw rubber composition, [(B)/(A)], is preferably in the range of 5/95 to 50/50. The composition is preferably in the form of friable bales or pellets.

BRIEF DESCRIPTION OF THE DRAWING

FIG. 3A is a top plan of a molded product used for a flowability evaluation test in the examples, and FIG. 3B is a vertical sectional view of the molded product.

FIG. 4 is a transverse sectional view of an extruder die used in the examples.

DETAILED DESCRIPTION OF THE INVENTION

Figure 1:
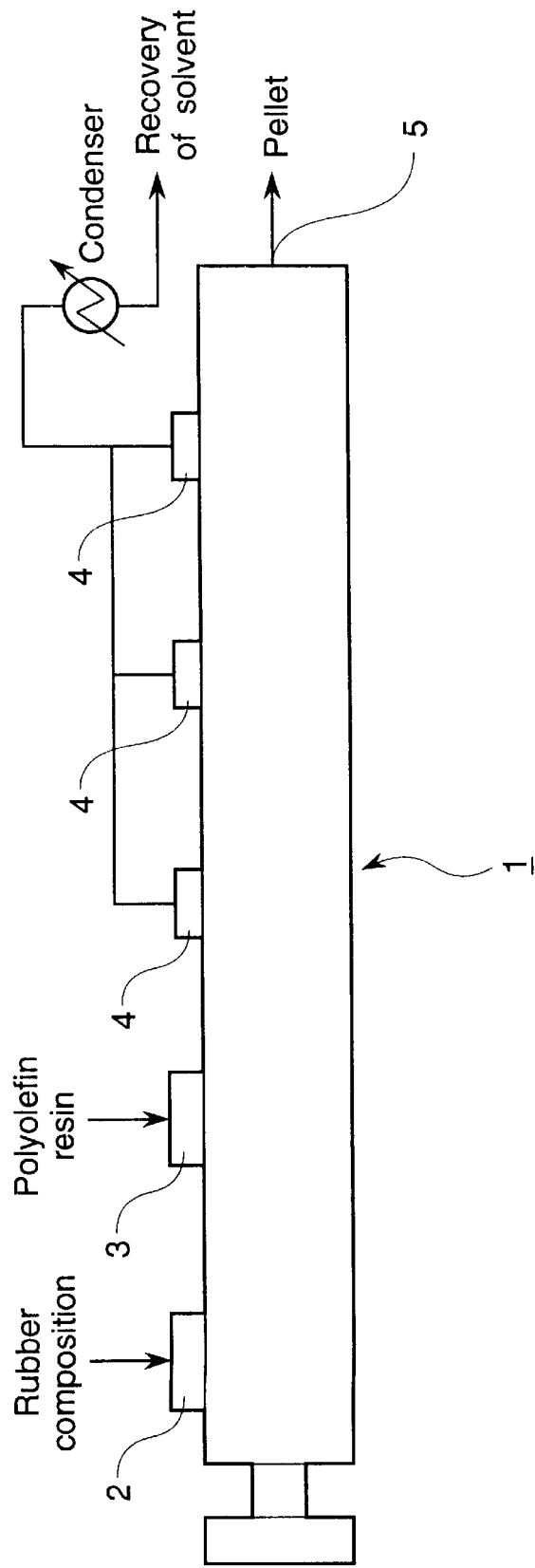
FIG. 1 is one embodiment of a multi-stage vented extruder used in the process for preparing rubber composition according to the invention, and is a schematic explanatory view of a twin-screw three-stage vented extruder.

The rubber composition and the process for preparing the rubber composition according to the invention are described in detail hereinafter.

The rubber composition of the invention is blend of an ethylene/α-olefin/nonconjugated polyene copolymer rubber (A), a polyolefin resin (B), and optionally, a foaming agent (C).

Ethylene/α-Olefin/Nonconjugated Polyene Copolymer Rubber (A)

The ethylene/α-olefin/nonconjugated polyene copolymer rubber (A) used in the invention comprises ethylene, an α-olefin of 3 to 20 carbon atoms and a nonconjugated polyene.

Examples of the α-olefins of 3 to 20 carbon atoms include propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene and 12-ethyl-1-tetradecene. Of these, preferable are propylene, 1-butene, 4-methyl-1-pentene, 1-hexene and 1-octene. Particularly preferable is propylene.

These α-olefins are used singly or in combination of two or more kinds.

Examples of the nonconjugated polyenes include:

chain nonconjugated dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6 -octadiene, 8-methyl-4-ethylidene-1,7-nonadiene and 4-ethylidene-1,7-undecadiene;

cyclic nonconjugated dienes, such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, 5-vinyl-2-nonbornene, 5-isopropenyl-2-norbornene, 5-isobutenyl-2-norbornene, cyclopentadiene and norbornadiene; and trienes, 2,3-diisopropylidene-5-norbornene, 2-ethylidene-3-isopropylidene-5-norbornene, 2-propenyl-2,2-norbornadiene and 4-ethylidene-8-methyl-1,7-nonadiene. Of these, preferable are 5-ethylidene-2-norbornene, 5-vinyl-2-norbornene, cyclopentadiene and 4-ethylidene-8-methyl-1,7-nonadiene.

The ethylene/α-olefin/nonconjugated polyene copolymer rubber (A) used in the invention usually has an ethylene content of 50 to 95% by mol, a content of the α-olefin of 3 to 20 carbon atoms of 5 to 50% by mol, and a nonconjugated polyene content (in terms of iodine value) of 1 to 40.

It is desired that the ethylene/α-olefin/nonconjugated polyene copolymer rubber (A) has an ethylene content of preferably 60 to 85% by mol, more preferably 65 to 80% by mol, and a content of the α-olefin of 3 to 20 carbon atoms of preferably 15 to 40% by mol, more preferably 20 to 35% by mol. It is desired that the copolymerization quantity of the nonconjugated polyene is in the range of 1 to 40, preferably 2 to 35, more preferably 3 to 30, in terms of iodine value. An intrinsic viscosity [η] thereof, as measured in decalin at 135° C., is preferably in the range of 0.8 to 4 dl/g, more preferably 1 to 3.5 dl/g.

The ethylene/α-olefin/nonconjugated polyene copolymer rubber (A) can be prepared by processes conventionally known.

The ethylene/α-olefin/nonconjugated polyene copolymer rubber (A) used in the invention may be graft copolymerized with unsaturated carboxylic acids or derivatives thereof (e.g., acid anhydrides, esters).

In the present invention, the ethylene/α-olefin/ nonconjugated polyene copolymer rubber (A) is desirably used in an amount of 50 to 95 parts by weight, preferably 60 to 90 parts by weight, based on 100 parts by weight of the total amount of the ethylene/α-olefin/nonconjugated polyene copolymer rubber (A) and the polyolefin resin (B).

Polyolefin Resin (B)

The polyolefin resin (B) used in the invention is a thermoplastic resin, and examples thereof include:

ethylene homopolymers (polyethylenes), such as high-density polyethylene (HDPE), medium-density polyethylene (MDPE), low-density polyethylene (LDPE) and linear low-density polyethylene (LLDPE) and crystalline ethylene/α-olefin copolymers of ethylene and α-olefins of 3 to 20, preferably 3 to 8 carbon atoms;

polypropylenes, such as a propylene homopolymer, a propylene block copolymer and a propylene random copolymer; and crystalline homopolymers or copolymers of α-olefins of 3 to 20, preferably 3 to 8 carbon atoms such as propylene, 1-butene, 4-methyl-1-pentene, 1-hexene, 1-heptene and 1-octene.

These polyolefin resins have a melting point of not higher than 250° C. Of these, preferable are polyethylenes and polypropylenes, particularly preferable are polypropylenes.

When the rubber composition of the invention contains the foaming agent (C), the crystalline α-olefin homopolymer or copolymer of α-olefins of 3 to 8 carbon atoms, preferably polypropylene, that is used as the polyolefin resin (B), has a Vicat softening point of not lower than 130° C., preferably not lower than 140° C.

In the present invention, the polyolefin resin (B) is desirably used in an amount of 5 to 50 parts by weight, preferably 10 to 40 parts by weight, based on 100 parts by weight of the total amount of the ethylene/α-olefin/nonconjugated polyene copolymer rubber (A) and the polyolefin resin (B).

Foaming Agent (C)

As the foaming agent (C), various foaming agents conventionally used for rubbers or rubber compositions are employable without any limitation.

Examples of the foaming agents include:

inorganic foaming agents, such as sodium bicarbonate, sodium carbonate, ammonium bicarbonate, ammonium carbonate and ammonium nitrite;

nitroso compounds, such as N,N'-dinitrosoterephthalamide and N,N'-dinitrosopentamethylenetetramine;

azo compounds, such as azodicarbonamide, azobisisobutyronitrile, azocyclohexylnitrile, azodiaminobenzene and barium azodicarboxylate;

sulfonylhydrazide compounds, such as benzenesulfonylhydrazide, toluenesulfonylhydrazide, p,p'-oxybis(benzenesulfonylhydrazide) and diphenylsulfone-3,3'-disulfonylhydrazide; and azide compounds, such as calcium azide, 4,4'-diphenyldisulfonylazide and paratoluenesulfonylazide.

Of these, preferably used are azo compounds, sulfonylhydrazide compounds and azide compounds.

In the present invention, the foaming agent (C) is used in an amount of 0.5 to 30 parts by weight, preferably 1 to 20 parts by weight, based on 100 parts by weight of the ethylene/α-olefin/nonconjugated polyene copolymer rubber (A). When the foaming agent (C) is used in the above-mentioned amount, a rubber composition capable of providing a foamed product having a specific gravity of 0.01 to 0.9 after the vulcanization foaming process can be obtained.

A foaming aid may optionally be used in combination with the foaming agent.

The foaming aid serves to control a decomposition temperature of the foaming agent (C) and to produce uniform foam. Examples of the foaming aids include organic acids, such as salicylic acid, phthalic acid, stearic acid and oxalic acid, urea and its derivative.

Rubber Composition

The rubber composition of the invention is a blend obtained by microdispersing the polyolefin resin (B) in the ethylene/α-olefin/nonconjugated polyene copolymer rubber (A) in a molten state, and a blending ratio by weight of the polyolefin resin (B) to the ethylene/α-olefin/nonconjugated polyene copolymer rubber (A), [(B)/(A)], is in the range of 5/95 to 50/50, preferably 10/90 to 40/60. When the blending ratio by weight is within the above range, elastomeric properties of the rubber products can be maintained.

In the microdispersed state, a mean dispersed particle diameter (number of particles measured: 40) of the polyolefin resin (B), as measured from a photograph taken by a transmission electron microscope of 10,000 magnifications, is desirably not more than 2 μm. In this specification, a mean diameter of atoms of the dispersed particles is referred to as a "mean dispersed particle diameter".

In the present invention, when the polyolefin resin (B) is crystalline homopolymers or copolymers of α-olefin of 3 to 20, preferably 3 to 8 carbon atoms, it is desired that a ratio of the intrinsic viscosity $[\eta]_A$ of the ethylene/α-olefin/ nonconjugated polyene copolymer rubber (A), as measured in decalin at 135° C., to the intrinsic viscosity $[\eta]_B$ of the polyolefin resin (B), as measured in decalin at 135° C., $[\eta]_A/[\eta]_B$, is usually 1±0.14, preferably 1±0.12. When the intrinsic viscosity ratio is within the above range, "islands" of the polyolefin resin (B) can be kept stable in the rubber phase, and this stability is never affected by heat, flow or shear force given in the conventional kneading process. As the intrinsic viscosity comes near to 1, the microdispersed state of the polyolefin resin (B) in the rubber phase becomes better.

As described above, the rubber composition wherein the polyolefin resin (B) is an ethylene homopolymer or a crystalline ethylene/α-olefin copolymer and the following rubber compositions (1), (2) and (3) are preferable.

(1) A Rubber Composition Comprising:

an ethylene/α-olefin/nonconjugated polyene copolymer rubber (A) which comprises ethylene, an α-olefin of 3 to 20 carbon atoms and a nonconjugated polyene; and a polyolefin resin (B) which is a crystalline α-olefin homopolymer of an α-olefin of 3 to 8 carbon atoms or a crystalline α-olefin copolymer of the α-olefins, wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50; and the hardness (Y, A hardness defined by JIS K 6301) of the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

(2) A Rubber Composition Comprising:

an ethylene/α-olefin/nonconjugated polyene copolymer rubber (A) which comprises ethylene, an α-olefin of 3 to 20 carbon atoms and a nonconjugated polyene;

a polyolefin resin (B) which is a crystalline α-olefin homopolymer of an α-olefin of 3 to 8 carbon atoms or a crystalline α-olefin copolymer of the α-olefins and has a Vicat softening point of not lower than 130° C.; and a foaming agent (C), wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50;

a blending ratio by weight of the foaming agent (C) to the ethylene/α-olefin/nonconjugated polyene copolymer rubber (A), [(C)/(A)], is in the range of 0.5/100 to 30/100; and the hardness (Y, A hardness defined by JIS K 6301) of the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

(3) A Rubber Composition Comprising:

an ethylene/α-olefin/nonconjugated polyene copolymer rubber (A) which comprises ethylene, an α-olefin of 3 to 20 carbon atoms and a nonconjugated polyene; and a polyolefin resin (B) which is a crystalline α-olefin homopolymer of an α-olefin of 3 to 8 carbon atoms or a crystalline α-olefin copolymer of the α-olefins, wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), [(B)/(A)], is in the range of 5/95 to 50/50; and the hardness (Y, A hardness defined by JIS K 6301) of a non-foamed vulcanized rubber molded product obtained by vulcanizing the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the molded product.

In the rubber compositions (1) to (3), a in the above equation is a hardness obtained by subtracting an increase of hardness given by blending the polyolefin resin (B) from the hardness of the rubber composition or the molded product. For example, in the case of a rubber composition composed of the ethylene/α-olefin/nonconjugated polyene copolymer rubber (A) and the polyolefin resin (B) which is microdispersed in the copolymer rubber (A), a is a hardness of a raw rubber, i.e., a hardness of the ethylene/α-olefin/nonconjugated polyene copolymer rubber (A). In the case of a rubber composition containing carbon black, oil and other compounding ingredients in addition to the ethylene/α-olefin/nonconjugated polyene copolymer rubber (A) and the polyolefin rubber (B), a is a hardness of a composition consisting of all the ingredients except the polyolefin resin (B), i.e., a hardness of a composition consisting of the ethylene/α-olefin/nonconjugated polyene copolymer rubber (A), carbon black, oil and other compounding ingredients.

From the rubber composition wherein the hardness (Y) of the rubber composition and the amount (X) of the polyolefin resin (B) or the hardness (Y) of a non-foamed vulcanized rubber molded product obtained by vulcanizing the rubber composition and the amount (X) of the polyolefin resin (B) satisfy the above-mentioned relation, a vulcanized rubber molded product having the following property can be obtained. That is, in the vulcanized rubber molded product obtained from the above rubber composition, a ratio of the permanent compression set ($G_a$) of a vulcanized rubber molded product obtained from a rubber composition consisting of the same components except for the polyolefin resin to the permanent compression set ($G_b$) of the vulcanized rubber molded product, ($G_a/G_b$), is represented by the following formula:

$$(1.0\pm0.2)X+F$$

wherein X is an amount (by weight) of the polyolefin resin (B) (total amounts of the components (A) and (B): 100 parts by weight), and F is a permanent compression set obtained by subtracting an increase of a permanent compression set given by blending the polyolefin resin (B) from the permanent compressions set ($G_B$) of the vulcanized rubber molded product.

It is desired that the dispersed particles of the polyolefin resin (B) have an aspect ratio (major axis/minor axis) of not more than 5, more preferably 1 to 3. When the aspect ratio is not more than 5, particles of the polyolefin resin (B) can be excellently microdispersed.

Such rubber composition can be prepared by sufficiently melting the ethylene/α-olefin/nonconjugated polyene copolymer rubber (A) and the polyolefin resin (B) in an extruder and then blending them until the polyolefin resin (B) is microdispersed in the ethylene/α-olefin/ nonconjugated polyene copolymer rubber (A).

When the dispersed state (I) of the polyolefin resin (B) which is previously blended with the ethylene/α-olefin/ nonconjugated polyene copolymer rubber (A) and then kneaded in the above-mentioned manner is compared with the dispersed state (II) of the polyolefin resin (B) which is kneaded with the ethylene/α-olefin/nonconjugated polyene copolymer rubber (A) and compounding ingredients such as reinforcing agent, filler, softener, vulcanization accelerator and vulcanizing agent by a rubber kneading machine for a conventional kneading time as in the conventional process, the former dispersed state (I) of the polyolefin resin (B) is extremely better.

Dispersibility of the polyolefin resin (B) cannot be evaluated by an electron photomicrograph after the rubber composition of the invention is compounded with additives such as carbon black.

Therefore, the present inventors estimated the effects of the rubber composition of the invention in the following manner. That is, in an extruder purged with a nitrogen gas, EPDM as the ethylene/α-olefin/nonconjugated polyene copolymer rubber (A) and polyethylene as the polyolefin resin (B) were blended at an extrusion temperature of 280° C. to prepare a rubber composition. Separately, EPDM and polyethylene pellets were kneaded by a Banbury mixer under the conventional kneading conditions (charge ratio: 75%, kneading time: 3 min) to prepare a polymer. Then, the dispersed state of the polyethylene in the rubber composition and the dispersed state of the polyethylene in the polymer were compared with each other.

As a result, in the case of the latter (polymer), non-crushed polyethylene pellets were present therein, so that it was expected that the polyethylene would be poorly dispersed even if the polymer was kneaded with additives such as carbon black and oil.

On the other hand, in the case of the former (polymer), no polyethylene particle was found in the rubber composition even when its electron microphotograph of 10,000 magnifications was examined, and the polyethylene was so excellently dispersed that lamella structure of the polyethylene was able to be found. From the result, it was expected that the polyethylene would be sufficiently dispersed even if the rubber composition was kneaded with additives such as carbon black and oil.

In the conventional kneading process wherein the rubber is blended with the polyolefin resin by a rubber kneading machine, the kneading temperature rises with addition of a reinforcing agent such as carbon black to the rubber, and when the kneading temperature reaches the melting point of the polyolefin resin, melting of the polyolefin resin and dispersing thereof in the compounded rubber are initiated. The polyolefin resin is the last among the compounding ingredients to begin to be kneaded (microdispersed), so that the time taken for the polyolefin resin dispersing is very short. Therefore, the polyolefin resin tends to be poorly dispersed in the compounded rubber to cause wide variability in the properties of the resulting rubber product.

Particularly, vulcanized rubber products, which contain polyethylene prepared in the winter season wherein the kneading temperature of a kneading machine is low and the polyethylene pellets have a high hardness, exhibit wide variability in the properties.

As described above, by the use of the rubber composition of the invention obtained by previously blending the polyolefin resin (B) with the ethylene/α-olefin/nonconjugated polyene copolymer rubber (A), the dispersibility of the polyolefin resin becomes excellent, and therefore a rubber product having narrow variability in the properties can be obtained. Moreover, shortening of the kneading time, that is a problem to be solved in the conventional blending process of the polyolefin resin, can be accomplished.

In order to obtain such effects as mentioned above, the polyolefin resin (B) having been microdispersed in the ethylene/α-olefin/nonconjugated polyene copolymer rubber (A) in a molten state desirably has a mean dispersed particle diameter of not more than 2 μm. When the mean dispersed particle diameter of the polyolefin resin (B) is not more than 2 μm, the polyolefin resin (B) is rapidly dispersed in the rubber composition and is melted with a small amount of heat when the temperature in the kneading machine reaches the melting point of the polyolefin resin (B).

In the rubber composition of the invention, the polyolefin resin (B) is previously blended with the ethylene/α-olefin/ nonconjugated polyene copolymer rubber (A). Therefore, when the blend (composition) is kneaded with compounding additives such as reinforcing agent, filler and softener, various problems may occur because of too high hardness of the raw rubber. From that respect the kneading properties thereof would be affected adversely. For example, the kneading temperature becomes extraordinarily high, scorch of the compounded rubber takes place, or the kneading torque becomes too high.

To cope with these problems, the rubber composition of the invention obtained by microdispersing the polyolefin resin (B) in the ethylene/α-olefin/nonconjugated polyene copolymer rubber (A) in a molten state is preferably extended with oil in an amount of 1 to 50 phr, preferably 5 to 30 phr to decrease the hardness of the raw rubber so as not to deteriorate the kneading properties. For the oil extension, oils (softeners) conventionally known are employable.

The rubber composition of the invention is desirably in the form of friable bales having a bale bulk specific gravity of not more than 0.7 so that the bales are easily broken by a mixer.

The process for preparing the rubber composition according to the invention wherein the polyolefin resin (B) is microdispersed in the ethylene/α-olefin/nonconjugated polyene copolymer rubber (A) is now described with reference to FIG. 1.

FIG. 1 shows one embodiment of a multi-stage vented extruder used in the process for preparing rubber composition according to the invention, and is a schematic explanatory view of a twin-screw three-stage vented extruder.

The pellets prepared by the process of the invention are pellets of a rubber composition comprising the ethylene/α-olefin/nonconjugated polyene copolymer rubber (A) and the polyolefin resin (B).

First, using an extruder equipped with a pelletizer, a rubber mixture (E) of the ethylene/α-olefin/nonconjugated polyene copolymer rubber (A) and an organic solvent (D) is kneaded with the polyolefin resin (B) to obtain a kneadate, and the kneadate is granulated to prepare pellets of a rubber composition composed of the ethylene/α-olefin/ nonconjugated polyene copolymer rubber (A) and the polyolefin resin (B).

Details of the ethylene/α-olefin/nonconjugated polyene copolymer rubber (A) and the polyolefin resin (B) are described hereinbefore.

As the organic solvent (D), known hydrocarbon solvents used for preparing ethylene/α-olefin/nonconjugated polyene copolymer rubbers in a solution polymerization process are employable.

Examples of the hydrocarbon solvents include:

aliphatic hydrocarbons, such as pentane, hexane, heptane, octane, decane, dodecane and kerosine, and halogen derivatives thereof;

alicyclic hydrocarbons, such as cyclohexane, methylcyclopentane and methylcyclohexane, and halogen derivatives thereof; and aromatic hydrocarbons, such as benzene, toluene and xylene, and halogen derivatives thereof such as chlorobenzene.

These solvents may be used singly or in combination.

The rubber mixture (E) is a mixture of the ethylene/α-olefin/nonconjugated polyene copolymer rubber (A) and the organic solvent (D), as described above.

In the rubber mixture (E), the organic solvent (D) is contained in an amount of 3 to 10 parts by weight based on 100 parts by weight of the ethylene/α-olefin/nonconjugated polyene copolymer rubber (A).

In the process for preparing rubber composition according to the invention, for instance, a solution of the ethylene/α-olefin/nonconjugated polyene copolymer rubber (A) comprising ethylene, an α-olefin of 3 to 20 carbon atoms and a nonconjugated polyene, that is prepared preferably by a solution polymerization process, is adjusted to have a content of the organic solvent (D) of 3 to 10 parts by weight based on 100 parts by weight of the ethylene/α-olefin/nonconjugated polyene copolymer rubber (A). Then, the resulting rubber mixture (E) is fed to a multi-stage vented extruder 1 (twin-screw three-stage vented extruder in FIG. 1) through its feed zone 2.

With the above feeding, the polyolefin resin (B) is fed to the extruder through another feed zone 3 in an inert gas atmosphere. Then, kneading of the rubber mixture (E) and the polyolefin resin (B) and desolvating were performed. Thus, a rubber composition composed of the ethylene/α-olefin/nonconjugated polyene copolymer rubber (A) and the polyolefin resin (B) is obtained. By pelletizing the rubber composition using a pelletizer (not shown) equipped at the end of the extruder 1, pellets of the rubber composition are obtained. And when a friable-bale-molder is equipped in place of the pelletizer, bales of the rubber composition are obtained.

Though not shown in FIG. 1, the polyolefin resin (B) metered by a thermoplastic resin meter is transferred into an oxygen replacing device. In the oxygen replacing device, oxygen is replaced with an inert gas. Then, the polyolefin resin is fed to a polyolefin resin feed zone 3 of the extruder 1.

Examples of the inert gas employable herein include nitrogen gas and argon gas. Preferably used is nitrogen gas. In the invention, feeding of the polyolefin resin (B) to the extruder is carried out by the use of the inert gas, and therefore rubber composition pellets free from oxidation deterioration can be obtained.

The blending ratio of the rubber mixture (E) and the polyolefin resin (B) is controlled by keeping the rotation number of a screw of the extruder 1 and the feed rate of the polyolefin resin (B) constant. Further, the pressure in the thermoplastic resin feed zone 3 is made lower than the pressure in the oxygen replacing device, thereby to stabilize the feed rate of the polyolefin resin (B).

The solvent released by the desolvating operation is discharged outside the extruder through a vent hole 4 and recovered.

The ethylene copolymer rubber composition prepared as above is discharged in the form of pellets or bales from the extruder 1 through a discharge opening 5.

The aforesaid oil extension of the ethylene/α-olefin/nonconjugated polyene copolymer rubber can be carried out in the presence of a solvent before the copolymer rubber is fed to the extruder 1.

In general, the rubber composition pellets prepared above are then kneaded with compounding ingredients such as reinforcing agent (e.g., carbon black), filler (e.g., talc, clay), softener, vulcanizing agent, vulcanization accelerator, vulcanization aid, processing aid, pigment, anti-aging agent, foaming agent (C) and foaming aid by means of conventional rubber kneading machines such as Banbury mixer, intermixer and kneader. The dispersed state of the polyolefin resin (B) in the compounded rubber obtained by the above kneading is extremely good.

Examples of the reinforcing agents include various carbon black, such as SRF, GPF, FEF, MAF, ISAF, SAF, FT and MT, and powdery silicic acid.

Examples of the fillers include soft calcium carbonate, ground limestone, talc and clay.

Though the amount of the reinforcing agent or the filler is properly selected according to the aimed product, it is usually not more than 200 parts by weight, preferably not more than 150 parts by weight, based on 100 parts by weight of the ethylene/α-olefin/nonconjugated polyene copolymer rubber (A).

As the softeners, those conventionally used for rubbers are employable, and examples thereof include:

petroleum type materials, such as process oil, lubricating oil, paraffin, liquid paraffin, petroleum asphalt and vaseline;

coal tars, such as coal tar and coal tar pitch;

fatty oils, such as castor oil, rapeseed oil, soybean oil and coconut oil;

waxes, such as tall oil, beeswax, carnauba wax and lanolin;

fatty acids and metallic salts thereof, such as ricinolic acid, palmitic acid, stearic acid, barium stearate and calcium stearate;

naphthenic acid and metallic soap thereof;

pine oil, rosin and derivatives thereof;

terpene resin, petroleum resin, coumarone-indene resin and atactic polypropylene;

ester type plasticizers, such as dioctyl phthalate, dioctyl adipate and dioctyl sebacate;

carbonate type plasticizers, such as diisododecyl carbonate; and other materials, such as microcrystalline wax, factice, liquid polybutadiene, modified liquid polybutadiene, liquid thiokol and hydrocarbon type synthetic lubricating oils.

Though the amount of the softener is properly selected according to the aimed product, it is usually not more than 100 parts by weight, preferably not more than 70 parts by weight, based on 100 parts by weight of the ethylene/α-olefin/nonconjugated polyene copolymer rubber (A).

As the vulcanizing agents, sulfur compounds and organic peroxides are employable.

Examples of the sulfur compounds include sulfur, sulfur chloride, sulfur dichloride, morpholine disulfide, alkylphenol disulfide, tetramethylthiuram disulfide and selenium dithiocarbamate. Of these, sulfur is preferable.

The sulfur compound is used in an amount of usually 0.1 to 10 parts by weight, preferably 0.5 to 5 parts by weight, based on 100 parts by weight of the ethylene/α-olefin/nonconjugated polyene copolymer rubber (A).

Examples of the organic peroxides include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethylcyclohexane and t-dibutyl hydroperoxide. Of these, dicumyl peroxide, di-t-butyl peroxide and di-t-butylperoxy-3,3,5-trimethylcyclohexane are preferable.

The organic peroxide is used in an amount of usually $3 \times 10^{-3}$ to $5 \times 10^{-2}$ mol, preferably $1 \times 10^{-3}$ to $3 \times 10^{-2}$ mol, based on 100 g of the ethylene/α-olefin/nonconjugated polyene copolymer rubber (A).

When the sulfur compound is used as the vulcanizing agent, a vulcanization accelerator is preferably used in combination.

Examples of the vulcanization accelerators include:

thiazole compounds, such as N-cyclohexyl-2-benzothiazole sulfenamide, N-oxydiethylene-2-benzothiazole sulfenamide, N,N'-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine, triphenylguanidine an diorthotolylguanidine;

aldehyde amine compounds, such as acetaldehyde-aniline condensate and butylaldehyde-aniline condensate;

imidazoline compounds, such as 2-mercaptoimidazoline;

thiourea compounds, such as diethylthiourea and dibutylthiourea;

thiuram compounds, such as tetramethylthiuram monosulfide and tetramethylthiuram disulfide;

dithio acid salt compounds, such as zinc dimethyldithiocarbamate, zinc diethyldithiocarbamate and tellurium diethyldithiocarbamate;

xanthate compounds, such as zinc dibutylxanthate; and other compounds, such as zinc white.

The vulcanization accelerator is used in an amount of 0.1 to 20 parts by weight, preferably 0.2 to 10 parts by weight, based on 100 parts by weight of the ethylene/α-olefin/nonconjugated polyene copolymer rubber (A).

When the organic peroxide is used as the vulcanizing agent, a vulcanization aid is preferably used in combination.

Examples of the vulcanization aids include:

sulfur;

quinonedioxime compounds, such as p-quinonedioxime;

acrylate compounds, such as ethylene glycol dimethacrylate and trimethylolpropane trimethacrylate;

allyl compounds, such as diallyl phthalate and triallyl isocyanurate; and other compounds, such as maleimide compounds and divinylbenzene.

The vulcanization aid is used in an amount of 0.5 to 2 mol based on 1 mol of the organic peroxide, preferably equimolar amount with the organic peroxide.

As the processing aids, those conventionally used for rubbers are employable, and examples thereof include higher fatty acids, such as ricinolic acid, stearic acid, palmitic acid and lauric acid; salts of the higher fatty acids, such as barium stearate, calcium stearate and zinc stearate; and esters of the higher fatty acids.

The processing aid is used in an amount of usually not more than about 10 parts by weight, preferably about 1 to 5 parts by weight, based on 100 parts by weight of the ethylene/α-olefin/nonconjugated polyene coplymer rubber (A).

Further, pigments are used depending on the aimed products. Employable as the pigments are conventionally known inorganic pigments (e.g., titanium white) and organic pigments (e.g., napthol green B). Though the amount of the pigment varies depending on the aimed product, it is usually not more than 20 parts by weight, preferably not more than 10 parts by weight, based on 100 parts by weight of the ethylene/α-olefin/nonconjugated polyene copolymer rubber (A).

The rubber composition of the invention exhibits excellent heat resistance and permanence, even if no anti-aging agent is sued. However, a life of the product can be made longer by the use of an anti-aging agent as well as in the conventional rubbers.

Examples of the anti-aging agents used herein include:

aromatic secondary amine stabilizers, such as phenylbutylamine and N,N'-di-2-naphthyl-p-phenylenediamine;

phenol stabilizers, such as dibutylhydroxytoluene and tetrakis[methylene(3,5-di-t-butyl-4-hydroxy)hydrocinnamate]methane;

thioether stabilizers, such as bis[2-methyl-4-(3-n-alkylthiopropionyloxy)-5-t-butylphenyl]sulfide; and dithiocarbamate stabilizers, such as nickel dibutyldithiocarbamate.

These anti-aging agents can be used singly or in combination of two or more kinds. The anti-aging agent is used in an amount of usually 0.1 to 5 parts by weight, preferably 0.5 to 3 parts by weight, based on 100 parts by weight of the ethylene/α-olefin/nonconjugated polyene copolymer rubber (A).

The rubber composition such as vulcanizable foamable rubber composition of the invention can be prepared by, for example, the following process.

First, the ethylene/α-olefin/nonconjugated polyene copolymer rubber (A) and the polyolefin resin (B), which are essential components of the invention, are mixed and kneaded in a molten state at a temperature of 200 to 250° C. for 20 seconds to 4 minutes by means of, for example, the aforesaid twin-screw extruder, whereby the polyolefin resin (B) is uniformly dispersed in the ethylene/α-olefin/nonconjugated polyene copolymer rubber (A) and with the mean dispersed particle diameter of the polyolefin resin (B) of not more than 2 μm.

Then, the resulting kneadate is further kneaded with additives such as reinforcing agent, filler, softener and pigment by means of mixers such as Banbury mixer at a temperature of about 80 to 170° C. for about 3 to 10 minutes.

Thereafter, using rolls such as open rolls, the kneadate is mixed with additives such as foaming agent (C), vulcanizing agents and vulcanization aid, milled at a roll temperature of about 40 to 80° C. for about 3 to 30 minutes and rolled into an unvulcanized compounded rubber in the form of ribbon or sheet, that is made of the vulcanizable foamable (or foaming) rubber composition of the invention.

The unvulcanized compounded rubber thus prepared is molded into a desired shape by means of, for example, an extruder, a calender roll, a press, an injection molding machine or a transfer molding machine. Simultaneously with the molding or thereafter, the molded product is heated usually at about 150 to 270° C. for about 1 to 30 minutes in a vulcanizing bath to perform vulcanization and foaming in such a manner that the specific gravity of the resulting product becomes usually 0.01 to 0.9, preferably 0.05 to 0.7, thereby obtaining a foamed product. Because the unvulcanized compounded rubber has excellent flowability, a large-sized foamed product can be obtained.

Examples of the vulcanizing baths employable herein include a steel vulcanizing can, a hot-air vulcanizing bath, a glass bead fluidized bed, a molten salt vulcanizing bath and a microwave bath. These vulcanizing baths can be used singly or in combination.

The foamed product obtained as above is well-balanced between strength, modulus and sealing properties. Therefore, it can be suitably used for heat insulating materials, cushioning materials, sealing materials and sound insulating materials. Particularly, from the vulcanizable foamable rubber composition of the invention, large-sized foamed products for sealing can be manufactured because of excellent flowability of the composition. Therefore, the rubber composition of the invention is of great value in the industrial use.

The reason that the vulcanizable foamable rubber composition of the invention has excellent flowability and that the foamed product obtained therefrom is well-balanced between the strength, modulus and sealing properties is not clear, but it is presumed that the crystalline polyolefin resin (B) functions as a plasticizer when the composition is molded and functions as a filler in the foamed product.

EFFECT OF THE INVENTION

The rubber composition of the invention is obtained by previously microdispersing the polyolefin resin (B) in the ethylene/α-olefin/nonconjugated polyene copolymer rubber (A) in a molten state, and therefore the polyolefin resin (B) that is slightly microdispersible can be easily microdispersed by a rubber kneading machine, even when the rubber composition is kneaded with compounding additives such as reinforcing agent, filler, softener, vulcanization accelerator and vulcanizing agent.

By the use of the rubber composition of the invention, accordingly, the polyolefin resin (B) can be reliably and sufficiently dispersed for a short period of time by a kneading machine conventionally used in the rubber industry, thereby to easily provide rubber products of high and stable quality at a low cost.

When the polyolefin resin (B) of the rubber composition of the invention is a crystalline α-olefin homopolymer of an α-olefin of 3 to 8 carbon atoms or a crystalline α-olefin copolymer of the same α-olefins and the rubber composition has the aforementioned specific relation between the hardness (Y) of the rubber composition and the amount (X) of the polyolefin resin (B) or between the hardness (Y) of a non-foamed vulcanized rubber molded product obtained by vulcanizing the rubber composition and the amount (X) of the polyolefin resin (B), the rubber composition has excellent processability (flowability). Besides, the hardness of the composition or the hardness of a product of the composition can be controlled even after rubber processing, and whereupon vulcanized rubber molded products of small permanent compression set can be produced.

Especially in the vulcanizable foamable rubber composition of the invention, a crystalline α-olefin homopolymer of an α-olefin of 3 to 8 carbon atoms or a crystalline α-olefin copolymer of said α-olefins is blended in a specific amount as the polyolefin resin (B) with the ethylene/α-olefin/nonconjugated polyene copolymer rubber (A), and the polyolefin resin (B) is dispersed in such a manner that the mean dispersed particle diameter of the polyolefin resin (B) is a specific value. Hence, this rubber composition has more improved flowability and can provide a foamed product (particularly large-sized foamed product) well-balanced among the strength, modulus and sealing properties. By vulcanizing this rubber composition, a vulcanized foamed rubber product having a specific gravity of 0.001 to 0.9 can be obtained.

According to the process for preparing the rubber compositions of the invention, there can be readily obtained rubber composition pellets or friable bales, which comprise the ethylene/α-olefin/nonconjugated polyene copolymer rubber (A) and the polyolefin resin (B), contain the polyolefin resin (B) sufficiently microdispersed, and are free from blocking. That is, rubber composition pellets or friable bales which contain the polyolefin resin (B) sufficiently microdispersed and are free from blocking can be readily obtained even if the composition comprise the ethylene/α-olefin/nonconjugated polyene copolymer rubber (A) of low ethylene content and the polyolefin resin (B).

According to the process of the invention, further, the polyolefin resin (B) is microdispersed in the ethylene/α-olefin/nonconjugated polyene copolymer rubber (A) in a molten state. Therefore, even when the rubber composition comprising the ethylene/α-olefin/nonconjugated polyene coplymer rubber (A) and the polyolefin resin (B) is kneaded with additives such as reinforcing agent, filler, softener, vulcanization accelerator and vulcanizing agent, the slightly microdispersible polyolefin resin (B) can be readily microdispersed by a rubber kneading machine.

EXAMPLE

The present invention will be further described with reference to the following examples, but it should be construed that the invention is in no way limited to those examples.

Described below are ethylene/α-olefin/nonconjugated polyene copolymer rubbers and polyolefin resins used in Examples A-1 to A-4 and Comparative Examples A-1 to A-4.

Ethylene/α-olefin/nonconjugated polyene copolymer rubber
- (1) Ethylene/propylene/5-ethylidene-2-norbornene copolymer rubber (referred to as "EPT" hereinafter)
  Ethylene content: 73% by mol
  Iodine value: 13
  Mooney viscosity ($ML_{1+4}(100°$ C.)): 110
- (2) Ethylene/1-butene/5-ethylidene-2-norbornene copolymer rubber (referred to as "EBT" hereinafter)
  Ethylene content: 90% by mol
  Iodine value: 22
  Mooney viscosity ($ML_{1+4}(100°$ C.)): 20

Polyolefin resin
- (1) Polyethylene (referred to as "PE" hereinafter)
  MFR: 1.6 g/10 min
  Density: 0.921 g/cm$^3$
- (2) Polypropylene (referred to as "PP" hereinafter)
  MFR (ASTM D 1238): 0.5 g/10 min
  Density (ASTM D 1505: 0.91 g/cm$^3$
- (3) Poly-4-methyl-1-pentene (referred to as TPX" hereinafter)
  MFR (ASTM D 1238): 0.5 g/10 min
  Density (ASTM D 1505): 0.91 g/cm$^3$ Comparative Example A-1

In a 4.3 liter Banbury mixer (manufactured by Kobe Seikojo K.K.), the compounding ingredients shown in Table 1 were kneaded in the amounts shown in Table 1 for 5 minutes in a charge ratio of 70%, to obtain a compounded rubber.

TABLE 1

| Rubber compounding ingredient | Amount (part(s) by weight) |
|---|---|
| EPT | 100 |
| PE | 20 |
| Stearic acid | 1 |
| Zinc white No. 1 | 5 |
| FEF carbon black *1 | 125 |
| Paraffinic process oil *2 | 90 |

*1: Seast SO (trade name), available from Tokai Carbon Co., Ltd.
*2: PW90 (trade name), available from Idemitsu Kosan Co., Ltd.

To the compounded rubber obtained above were added 1.5 parts by weight of sulfur, 1.5 parts by weight of a vulcanization accelerator MBT (trade name: Nocceller M, available from Ouchi-Shinko Chemical Industry Co., Ltd.), 0.5 part by weight of a vulcanization accelerator ZnBDC (trade name: Nocceller BZ, available from Ouchi-Shinko Chemical Industry Co., Ltd.), 0.5 part by weight of a vulcanization accelerator TeEDC (trade name: Nocceller TTTE, available from Ouchi-Shinko Chemical Industry Co., Ltd.) and 0.75 part by weight of a vulcanization accelerator DPTT (trade name: Nocceller TRA, available from Ouchi-Shinko Chemical Industry Co., Ltd.), and they were kneaded by 16 inch rolls (temperature of front and back rolls: 50° C.) to obtain an unvulcanized rubber.

Then, Mooney viscosity ($ML_{1+4}(100°$ C.$)$) of the unvulcanized rubber and $t_5$ (min), $t_{90}$ (min) defined by JIS K 6301 were measured.

The results are set forth in Table 9.

The unvulcanized rubber was then press-vulcanized at 160° C. for 20 minutes to prepare a vulcanized rubber sheet having a thickness of 2 mm.

The vulcanized rubber was subjected to a tensile test, a hardness test and a permanent compression test in accordance with JIS K 6301, to measure tensile strength ($T_B$), elongation ($E_B$), spring hardness ($H_S$, JIS A hardness) and permanent compression set (CS).

The results are set forth in Table 9.

Further, dispersibility of the polyolefin resin was evaluated in the following manner.

The compounded rubber before addition of the vulcanizing agent and vulcanization accelerators was extruded by means of a Garvey die used in the method A of ASTM-D2230-77 at a screw rotation number of 45 rpm under the temperature conditions of a screw temperature of 40° C., a barrel temperature of 60° C., an end zone temperature of 70° C. and a die temperature of 80° C., to obtain a sample. Then, the number of foreign matters of the resin per 10 m of the sample was counted (the foreign matters are caused by poor dispersing of the resin). The dispersibility of the polyolefin resin was evaluated based on the number of the foreign matters.

The results are set forth in Table 9.

Example A-1

The procedure of Comparative Example A-1 was repeated except that the compounding ingredients and the amounts shown in Table 1 were replaced with those shown in Table 2.

The mean dispersed particle diameter of the polyolefin resin dispersed particles in the ethylene copolymer rubber composition (I) shown in Table 2 was measured by means of an electron microscope (trade name: H-8100 (200 KV), available from Hitachi Seisakujo, Ltd.). The sample used in this measurement was prepared in the following manner.

Preparation of Sample

The ethylene copolymer rubber composition (I) was trimmed and cut into a thin film of not more than 0.1 μm by means of a microtome. The thin film was dyed with ruthenic acid and then deposited with carbon, to obtain a sample for electron microscopy.

The data obtained are shown below in Table 2.

TABLE 2

| Rubber compounding ingredient | Amount (part(s) by weight) |
|---|---|
| Ethylene copolymer rubber composition (I) *1 | 130 |
| Stearic acid | 1 |
| Zinc white No. 1 | 5 |
| FEF carbon black *2 | 125 |
| Paraffinic process oil *3 | 80 |

*1: Ethylene copolymer rubber composition (I):
EPT (100 parts by weight) + PE (20 parts by weight) + paraffinic process oil (10 parts by weight)
Bale type of the rubber composition (I): friable
Mean particle diameter of dispersed PE particles: <0.01 μm
*2: Seast SO (trade name), available from Tokai Carbon Co., Ltd.
*3: PW90 (trade name), available from Idemitsu Kosan Co., Ltd.

The results are set forth in Table 9.

The ethylene copolymer rubber composition (I) was prepared by a twin-screw kneading extruder.

The blending ratio between the ethylene/α-olefin/nonconjugated copolymer rubber and the polyolefin resin was controlled by keeping the rotation number of the extruder screw constant and keeping the feed rate of the polyolefin resin fed from the thermoplastic resin meter constant. Further, the oil extension of the ethylene/α-olefin/nonconjugated polyene copolymer rubber was carried out in the presence of a solvent before the copolymer rubber was fed to the extruder.

As a bale type of the ethylene copolymer composition, the ethylene copolymer rubber composition which was foamed by injecting nitrogen into the extruder to discharge therefrom, was pressed into the friable bale.

Comparative Example A-2

The procedure of Comparative Example A-1 was repeated except that the compounding ingredients and the amounts shown in Table 1 were replaced with those shown in Table 3.

TABLE 3

| Rubber compounding ingredient | Amount (part(s) by weight) |
|---|---|
| EPT | 100 |
| PP | 20 |
| Stearic acid | 1 |
| Zinc white No. 1 | 5 |
| FEF carbon black *1 | 125 |
| Paraffinic process oil *2 | 90 |

*1: Seast SO (trade name), available from Tokai Carbon Co., Ltd.
*2: PW90 (trade name), available from Idemitsu Kosan Co., Ltd.

The results are set forth in Table 9.

Example A-2

The procedure of Example A-1 was repeated except that the compounding ingredients and the amounts shown in Table 2 were replaced with those shown in Table 4.

TABLE 4

| Rubber compounding ingredient | Amount (part(s) by weight) |
|---|---|
| Ethylene copolymer rubber composition (II) *1 | 130 |
| Stearic acid | 1 |
| Zinc white No. 1 | 5 |
| FEF carbon black *2 | 125 |
| Paraffinic process oil *3 | 80 |

*1: Ethylene copolymer rubber composition (II):
EPT (100 parts by weight) + PP (20 parts by weight) + paraffinic process oil (10 parts by weight)
Bale type of the rubber composition (II): friable
Intrinsic viscosity [η] of PP (measured in decalin at 135° C.): 2.36 dl/g
Mean particle diameter of PP dispersed particles: 0.5 μm
Aspect ratio of PP dispersed particle: 1.7
*2: Seast SO (trade name), available from Tokai Carbon Co., Ltd.
*3: PW90 (trade name), available from Idemitsu Kosan Co., Ltd.

The results are set forth in Table 9.

Comparative Example A-3

The procedure of Comparative Example A-1 was repeated except that the compounding ingredients and the amounts shown in Table 1 were replaced with those shown in Table 5.

TABLE 5

| Rubber compounding ingredient | Amount (part(s) by weight) |
|---|---|
| EBT | 100 |
| PE | 20 |
| Stearic acid | 1 |
| Zinc white No. 1 | 5 |
| FEF carbon black *1 | 125 |
| Paraffinic process oil *2 | 90 |

*1: Seast SO (trade name), available from Tokai Carbon Co., Ltd.
*2: PW90 (trade name), available from Idemitsu Kosan Co., Ltd.

The results are set forth in Table 9.

Example A-3

The procedure of Example A-1 was repeated except that the compounding ingredients and the amounts shown in Table 2 were replaced with those shown in Table 6.

TABLE 6

| Rubber compounding ingredient | Amount (part(s) by weight) |
|---|---|
| Ethylene copolymer rubber composition (III) *1 | 130 |
| Stearic acid | 1 |
| Zinc white No. 1 | 5 |
| FEF carbon black *2 | 125 |
| Paraffinic process oil *3 | 80 |

*1: Ethylene copolymer rubber composition (III):
EBT (100 parts by weight) + PE (20 parts by weight) + paraffinic process oil (10 parts by weight)
Bale type of the rubber composition (III): friable
Mean particle diameter of PE dispersed particles: <0.01 μm TABLE 6-continued

| Rubber compounding ingredient | Amount (part(s) by weight) |
|---|---|

*2: Seast SO (trade name), available from Tokai Carbon Co., Ltd.
*3: PW90 (trade name), available from Idemitsu Kosan Co., Ltd.

The results are set forth in Table 9.

Comparative Example A-4

The procedure of Comparative Example A-1 was repeated except that the compounding ingredients and the amounts shown in Table 1 were replaced with those shown in Table 7.

TABLE 7

| Rubber compounding ingredient | Amount (part(s) by weight) |
|---|---|
| EPT | 100 |
| TPX | 20 |
| Stearic acid | 1 |
| Zinc white No. 1 | 5 |
| FEF carbon black *1 | 125 |
| Paraffinic process oil *2 | 90 |

*1: Seast SO (trade name), available from Tokai Carbon Co., Ltd.
*2: PW90 (trade name), available from Idemitsu Kosan Co., Ltd.

The results are set forth in Table 9.

Example A-4

The procedure of Example A-1 was repeated except that the compounding ingredients and the amounts shown in Table 2 were replaced with those shown in Table 8.

TABLE 8

| Rubber compounding ingredient | Amount (part(s) by weight) |
|---|---|
| Ethylene copolymer rubber composition (IV) *1 | 130 |
| Stearic acid | 1 |
| Zinc white No. 1 | 5 |
| FEF carbon black *2 | 125 |
| Paraffinic process oil *3 | 80 |

*1: Ethylene copolymer rubber composition (IV):
EPT (100 parts by weight) + TPX (20 parts by weight) + paraffinic process oil (10 parts by weight)
Bale type of the rubber composition (IV): friable
Intrinsic viscosity [η] of TPX (measured in decalin at 135° C.): 1.01 dl/g
Mean particle diameter of TPX dispersed particles: 0.5 μm
Aspect ratio of TPX dispersed particle: 1.5
*2: Seast SO (trade name), available from Tokai Carbon Co., Ltd.
*3: PW90 (trade name), available from Idemitsu Kosan Co., Ltd.

The results are set forth in Table 9.

TABLE 9

|  | Comp. Ex.A-1 | Ex. A-1 | Comp. Ex.A-2 | Ex. A-2 | Comp. Ex.A-3 | Ex. A-3 | Comp. Ex.A-4 | Ex. A-4 |
|---|---|---|---|---|---|---|---|---|
| Temperature of compounded rubber immediately after discharge from Banbury mixer [° C.]* | 124 | 135 | 125 | 135 | 125 | 128 | 129 | 130 |
| State of discharged compounded rubber, presence of thermoplastic resin* | yes | no | yes | no | yes | no | yes | no |
| Property of unvulcanized rubber* | | | | | | | | |
| $ML_{1+4}$ (100° C.) | 34 | 32 | 37 | 36 | 26 | 25 | 37 | 37 |
| $t_5$ (min) | 8.2 | 8.3 | 8.7 | 8.1 | 8.4 | 8.4 | 8.4 | 8.3 |
| $t_{90}$ (min) | 15.7 | 15.8 | 16.9 | 16.3 | 13.9 | 13.1 | 16.9 | 16.4 |
| Property of vulcanized rubber* | | | | | | | | |
| $T_B$ (kgf/cm$^2$) | 123 | 124 | 108 | 110 | 125 | 124 | 104 | 108 |
| $E_B$ (%) | 480 | 490 | 410 | 420 | 510 | 530 | 390 | 410 |
| HS (JIS A hardness) | 71 | 72 | 74 | 74 | 90 | 90 | 80 | 80 |
| CS (%) | 35 | 36 | 33 | 32 | 42 | 39 | 34 | 33 |
| Evaluation of dispersibility of thermoplastic resin | | | | | | | | |
| A. Kneading time of 2 min Garvey die evaluation Number of foreign matter | 54 | 0 | 74 | 0 | 45 | 0 | 53 | 0 |
| B. Kneading time of 4 min Garvey die evaluation Number of foreign matter | 12 | 0 | 54 | 0 | 8 | 0 | 49 | 0 |

*:Property of compounded rubber after kneading time of 5 min.

From the results in Table 9, the followings were confirmed.

In Examples A-1 to A-4, the polyolefin resin was previously microdispersed in the oil-extended ethylene/α-olefin/nonconjugated polyene copolymer rubber, so that the polyolefin resin was microdispersed in the compounded rubber together with the paraffinic process oil and carbon black in spite of a short kneading time of 2 minutes. This can be confirmed by that any foreign matter caused by poor dispersing of the polyolefin resin was not observed in the extrusion test for evaluating the dispersibility of the polyolefin resin.

On the other hand, in Comparative Examples A-1 to A-4, kneading of the ethylene/α-olefin/nonconjugated polyene copolymer rubber and the polyolefin resin was carried out together with the addition of the paraffinic process oil and carbon black. Therefore, it was difficult to sufficiently melt and knead the polyolefin resin for a short kneading time of 2 minutes. As a result, a part of the polyolefin resin remained in the non-dispersed form in the compounded rubber discharged from the Banbury mixer. In the extrusion test, a great number of foreign matters of the polyolefin resin were found. In Comparative Examples A-1 to A-4 wherein the kneading time was 4 minutes, the number of the foreign matters was decreased, but did not become 0. In order to inhibit occurrence of the foreign matters caused by poor dispersing of the polyolefin resin, much longer kneading time and greater heat energy are presumably required.

Especially in Comparative Example A-2 wherein PP was used as the polyolefin resin, the kneading temperature did not reach the melting point of PP, so that a large quantity of PP still remained in the form of pellets in the compounded rubber.

On the other hand, in Example A-2, no foreign matter (PP) was observed in the extrusion test in spite that the kneading temperature did not reach the melting point of PP. This fact supports the effect of the present invention that the polyolefin resin can be microdispersed in the compounded rubber.

Described below are ethylene/α-olefin/nonconjugated polyene copolymer rubbers and polyolefin resins used in Examples B-1 to B-16 and Comparative Examples B-1 to B-8.

Ethylene/α-olefin/nonconjugated polyene copolymer rubber (EPT)

(1) Ethylene/propylene/5-ethylidene-2-norbornene copolymer rubber (EPT-1)
   Ethylene content: 68% by mol
   Iodine value: 22
   Mooney viscosity ($ML_{1+4}$(100° C.)): 300
   Intrinsic viscosity [η] (measured in decalin at 135° C.): 3.9 dl/g (2) Ethylene/propylene/5-ethylidene-2-norbornene copolymer rubber (EPT-2)
   Ethylene content: 78% by mol
   Iodine value: 12
   Mooney viscosity ($ML_{1+4}$(100° C.)): 70 (after oil extension)

Mooney viscosity ($ML_{1+4}(100°$ C.)): 160 (before oil extension)

Intrinsic viscosity [η] (measured in decalin at 135° C.): 3.34 dl/g

Amount of oil extension: paraffinic oil of 40 parts by weight based on 100 parts by weight of the rubber (3) Ethylene/propylene/5-ethylidene-2-norbornene copolymer rubber (EPT-3)

Ethylene content: 68% by mol

Iodine value: 22

Mooney viscosity ($ML_{1+4}(100°$ C.)): 80 (after oil extension)

Mooney viscosity ($ML_{1+4}(100°$ C.)): 110 (before oil extension)

Intrinsic viscosity [η] (measured in decalin at 135° C.): 2.86 dl/g

Amount of oil extension: paraffinic oil of 20 parts by weight based on 100 parts by weight of the rubber (4) Ethylene/propylene/5-ethylidene-2-norbornene copolymer rubber (EPT-4)

Ethylene content: 68% by mol

Iodine value: 12

Mooney viscosity ($ML_{1+4}(100°$ C.)): 70

Intrinsic viscosity [η] (measured in decalin at 135° C.): 2.12 dl/g (5) Ethylene/propylene/5-ethylidene-2-norbornene copolymer rubber (EPT-5)

Ethylene content: 63% by mol

Iodine value: 22

Mooney viscosity ($ML_{1+4}(100°$ C.)): 30

Intrinsic viscosity [η] (measured in decalin at 135° C.): 1.45 dl/g (6) Ethylene/propylene/5-ethylidene-2-norbornene copolymer rubber (EPT-6)

Ethylene content: 80% by mol

Iodine value: 12

Mooney viscosity ($ML_{1+4}(100°$ C.)): 10

Intrinsic viscosity [η] (measured in decalin at 135° C.): 1.02 dl/g

Polyolefin resin (1) Polypropylene (homopolymer: PP-1)

MFR: 0.55 g/10 min

Density: 0.91 g/cm$^3$

Intrinsic viscosity [η] (measured in decalin at 135° C.): 3.58 dl/g (2) Polypropylene (homopolymer: PP-2)

MFR (ASTM D 1238): 1.71 g/10 min

Density (ASTM D 1505): 0.91 g/cm$^3$

Intrinsic viscosity [η] (measured in decalin at 135° C.): 2.74 dl/g (3) Polypropylene (homopolymer: PP-3)

MFR (ASTM D 1238): 7.44 g/10 min

Density (ASTM D 1505): 0.91 g/cm$^3$

Intrinsic viscosity [η] (measured in decalin at 135° C.): 2.04 dl/g (4) Polypropylene (homopolymer: PP-4)

MFR (ASTM D 1238): 41.1 g/10 min

Density (ASTM D 1505): 0.91 g/cm$^3$

Intrinsic viscosity [η] (measured in decalin at 135° C.): 1.41 dl/g (5) Polypropylene (homopolymer: PP-5)

MFR (ASTM D 1238): 3.41 g/10 min

Density (ASTM D 1505): 0.91 g/cm$^3$

Intrinsic viscosity [η] (measured in decalin at 135° C.): 2.36 dl/g (6) Poly-4-methyl-1-pentene resin (PMP)

MFR (ASTM D 1238): 0.5 g/10 min

Density (ASTM D 1505): 0.91 g/cm$^3$

Intrinsic viscosity [η] (measured in decalin at 135° C.): 1.01 dl/g

Examples B-1–B-5, Comparatives Examples B-1–B-5

In a 2.95 liter Banbury mixer (manufactured by Kobe Seikojo K.K.), EPT and PP were kneaded in the amounts shown in Table 10 for 5 minutes in a charge ratio of 70% to obtain a resin-EPT blend. Measurement of the temperature of the resin-EPT blend obtained after the 5-minute kneading operation resulted in 145° C. (kneading temperature).

An aspect ratio and a hardness ($H_S$, JIS A) of the polypropylene (PP) dispersed particles in the resin-EPT blend and a hardness ($H_S$, JIS A) of the raw rubber (EPT) are set forth in Tables 10 and 11.

The harness of the resin-EPT blend and the raw rubber was measured in the following manner. Using a 50 ton pressing machine, the resin-EPT blend or the raw rubber was pre-heated at 120° C. for 6 minutes, then hot-pressed for 4 minutes and cooled to prepare a sheet (10 cm×10 cm, thickness: 2 mm). The sheet was measured on its hardness in accordance with JIS K 6301 (JIS A hardness).

The aspect ratio of the PP dispersed particle was measured from an electron photomicrograph thereof. That is, a slice of the resin-EPT blend was dyed with ruthenic acid, and its photograph was taken by a transmission electron microscope of 3,000 magnification. 30 of polyolefin resin (particle) were randomly sampled therefrom, and a mean particle diameter thereof was calculated by an image analyzing device (trade name: LA-500, manufactured by PIAS Co.). With respect to each of the particles, an aspect ratio was obtained and a mean of the aspect ratios was taken as the aspect ratio of the PP dispersed particle.

Then, in a 2.95 liter Banbury mixer (manufactured by Kobe Seikojo K.K.), the resin-EPT blend, stearic acid, zinc white No. 1 and FEF carbon black were kneaded in the amounts shown in Table 12 for 5 minutes in a charge ratio of 70%.

Immediately after the kneading operation, roll processing was performed. That is, to the kneadate obtained above were added sulfur, a vulcanization accelerator M (trade name: Sanceler M, available from Sanshin Kagaku K.K.), a vulcanization accelerator Bz (trade name: Sanceler Bz, available from Sanshin Kagaku Kogyo K.K.) and a vulcanization accelerator TRA (trade name: Sanceler TRA, available from Sanshin Kagaku Kogyo K.K.) in the amounts shown in Table 12, and they were kneaded by 8 inch rolls (temperature of front and back rolls: 50° C.) to obtain an unvulcanized compounded rubber.

The roll processability of the compounded rubber was evaluated from a photograph of the adhesion state of the compounded rubber in the roll processing operation.

Three-rank Evaluation

3: Adhesion of a compounded rubber to rolls is very good.

2: Adhesion of a compounded rubber to rolls is good.

1: A compounded rubber does not adhere to rolls at all.

The hardness ($H_S$, JIS A) of the unvulcanized compounded rubber was measured in the same manner as used for measuring the hardness of the resin-EPT blend.

The results are set forth in Tables 10 and 11.

Then, the unvulcanized compounded rubber was pre-heated at 120° C. for 6 min without applying pressure, then applied pressure for 4 min, cooled to 25° C. for 5 min keep applying pressure to prepare a vulcanized rubber sheet having a thickness of 2 mm.

The vulcanized rubber was subjected to a hardness test and a permanent compression test in accordance with JIS K 6301, to measure hardness ($H_S$, JIS A hardness) and permanent compression set (CS).

The results are set forth in Tables 10 and 11.

TABLE 10

| | \multicolumn{5}{c}{Example} | | | | |
|---|---|---|---|---|---|
| | B-1 | B-2 | B-3 | B-4 | B-5 |
| EPT/PP (blending ratio by weight) | 100/20 | 100/20 | 100/20 | 100/20 | 100/20 |
| Kind of EPT | EPT-1 | EPT-2 | EPT-3 | EPT-4 | EPT-5 |
| Kind of PP | PP-1 | PP-1 | PP-2 | PP-3 | PP-4 |
| $[\eta]_{EPT}/[\eta]_{PP}$ | 1.09 | 0.93 | 1.04 | 1.04 | 1.03 |
| Aspect ratio of PP dispersed particles | 1.1 | 1.1 | 1.1 | 1.1 | 1.2 |
| Hs (JIS A) of resin-EPT blend | 51 | 56 | 53 | 54 | 45 |
| Hs (JIS A) of raw rubber | 41 | 46 | 41 | 41 | 35 |
| ΔHs | 10 | 10 | 12 | 13 | 10 |
| k value in Y = kX + a | 0.5 | 0.5 | 0.5 | 0.5 | 0.5 |
| Mooney viscosity $ML_{1+4}$ (121° C.) | 70 | 62 | 50 | 68 | 39 |
| Compounded rubber | | | | | |
| Hs (JIS A) | 55 | 61 | 55 | 55 | 49 |
| Roll processability | 3 | 3 | 3 | 3 | 3 |
| Vulcanized rubber product | | | | | |
| Hs (JIS A) | 60 | 61 | 60 | 60 | 58 |
| CS (120° C.-22 hrs) (%) | 46 | 50 | 53 | 59 | 68 |

TABLE 11

| | \multicolumn{5}{c}{Comparative Example} | | | | |
|---|---|---|---|---|---|
| | B-1 | B-2 | B-3 | B-4 | B-5 |
| EPT/PP (blending ratio by weight) | 100/20 | 100/20 | 100/20 | 100/20 | 100/20 |
| Kind of EPT | EPT-4 | EPT-4 | EPT-4 | EPT-4 | EPT-3 |
| Kind of PP | PP-1 | PP-2 | PP-5 | PP-4 | PP-4 |
| $[\eta]_{EPT}/[\eta]_{PP}$ | 0.59 | 0.77 | 0.90 | 1.50 | 2.00 |
| Aspect ratio of PP dispersed particles | 5.6 | 6.2 | 7.5 | 10.1 | 8.5 |
| Hs (JIS A) of resin-EPT blend | 69 | 65 | 60 | 64 | 73 |
| Hs (JIS A) of raw rubber | 41 | 41 | 41 | 41 | 41 |
| ΔHs | 28 | 24 | 19 | 23 | 32 |
| K value in Y = kX + a | 1.4 | 1.2 | 0.95 | 1.15 | 1.60 |
| Mooney viscosity $ML_{1+4}$ (121° C.) | 92 | 90 | 85 | 81 | 96 |
| Compounded rubber | | | | | |
| Hs (JIS A) | 73 | 69 | 64 | 68 | 77 |
| Roll processability | 1 | 1 | 1 | 1 | 1 |
| Vulcanized rubber product | | | | | |
| Hs (JIS A) | 69 | 70 | 68 | 67 | 73 |
| CS (120° C.-22 hrs) (%) | 68 | 70 | 69 | 67 | 74 |

TABLE 12

| Rubber compounding ingredient | Amount (part(s) by weight) |
|---|---|
| Resin-EPT blend | 120 |
| Stearic acid | 1 |
| Zinc white No. 1 | 5 |
| FEF carbon black *1 | 55 |

TABLE 12-continued

| Rubber compounding ingredient | Amount (part(s) by weight) |
|---|---|
| Paraffinic process oil *2 | 60 |
| Sulfur | 0.5 |
| Vulcanization accelerator M *3 | 1.0 |
| Vulcanization accelerator Bz *3 | 2.0 |
| Vulcanization accelerator TRA *3 | 0.5 |

*1: Asahi #60 (trade name), available from Asahi Carbon Co., Ltd.
*2: PW90 (trade name), available from Idemitsu Kosan Co., Ltd.
*3: available from Sanshin Kagaku Kogyo K.K.

Example B-6

A resin-EPT blend having an aspect ratio of PP dispersed particle of 1.2 was obtained in the same manner as in Example B-1 except that EPT-4 and PP-3 were used in a blending ratio by weight of 100/20 (EPT-4/PP-3). The kneading operation was carried out at kneading temperatures of 129° C., 158° C. and 161° C.

A ratio of the intrinsic viscosity of the EPT $[\eta]_{EPT}$ as measured in decalin at 135° C. to the intrinsic viscosity of the PP $[\eta]_{PP}$ as measured in decalin at 135° C., $[\eta]_{EPT}/[\eta]_{PP}$, was 1.00.

The hardness and Mooney viscosity of the resin-EPT blend obtained were measured in the same manner as in Example B-1.

The results are set forth in Table 13.

TABLE 13

| | \multicolumn{3}{c}{Kneading temperature} | | |
|---|---|---|---|
| | 129° C. | 158° C. | 161° C. |
| $H_S$ (JIS A) | 54 | 55 | 56 |
| $ML_{1+4}$ (121° C.) | 68 | 68 | 69 |

Comparative Example B-6

A resin-EPT blend having an aspect ratio of PP dispersed particle of 10.2 was obtained in the same manner as in Example B-1 except that EPT-4 and PP-1 were used in blending ratio by weight of 100/20 (EPT-4/PP-1). The kneading operation was carried out at kneading temperatures of 129° C., 158° C. and 161° C.

A ratio of the intrinsic viscosity of the EPT as measured in decalin at 135° C. to the intrinsic viscosity of the PP as measured in decalin at 135° C., $[\eta]_{EPT}/[\eta]_{PP}$, was 0.57.

The hardness and Mooney viscosity of the resin-EPT blend obtained were measured in the same manner as in Example B-1.

The results are set forth in Table 14.

TABLE 14

| | \multicolumn{3}{c}{Kneading temperature} | | |
|---|---|---|---|
| | 129° C. | 158° C. | 161° C. |
| $H_S$ (JIS A) | 67 | 69 | 78 |
| $ML_{1+4}$ (121° C.) | 77 | 79 | 98 |

Comparative Example B-7

In a 2.95 liter Banbury mixer (manufactured by Kobe Seikojo K.K.), EPT-1, stearic acid, zinc white No. 1, carbon black (trade name: Seast G-116, available from Tokai Carbon Co., Ltd.) and oil (trade name: PW-380, available from Idemitsu Kosan Co., Ltd.) were kneaded in the amounts shown in Table 15 for 5 minutes in a charge ratio of 70%.

Immediately after the kneading operation, roll processing was performed. That is, to the kneadate obtained above were added sulfur, a vulcanization accelerator M (trade name: Sanceler M, available from Sanshin Kagaku Kogyo K.K.), a vulcanization accelerator Bz (trade name: Sanceler Bz, available from Sanshin Kagaku Kogyo K.K.) and a vulcanization accelerator TT (trade name: Sanceler TT, available from Sanshin Kagaku Kogyo K.K.) in the amounts shown in Table 15, and they were kneaded by 8 inch rolls (temperature of front and back rolls: 50° C.) to obtain an unvulcanized compounded rubber.

The minimum Mooney viscosity (VmML) and the Mooney scorch time ($t_S$) of the unvulcanized compounded rubber were measured in accordance with JIS K 6300. The vulcanizing rate of the compounded rubber was evaluated in the following manner. A vulcanization curve was obtained by a JSR Curelastmeter Model 3 (manufactured by Japan Synthetic Rubber Co., Ltd.), and a difference (ME) between the minimum value (ML) of the torque and the maximum value (MH) of the torque obtained from the vulcanization curve was calculated (ME=MH−ML). The vulcanizing rate was evaluated based on the time $T_{90}$ (min) at which 90% ME is reached.

The results are set forth in Table 15.

Then, the unvulcanized compounded rubber was preheated at 120° C. for 6 min without applying pressure, then applied pressure for 4 min, and cooled to 25° C. for 5 min with applying pressure, to prepare a vulcanized rubber sheet having a thickness of 2 mm.

The vulcanized rubber was subjected to a tensile test, a hardness test and a permanent compression test in accordance with JIS K 6301.

The results are set forth in Table 15.

Example B-7

In an extruder previously purged with nitrogen, a resin-EPT blend having an aspect ratio of PP dispersed particle of 1.3 was obtained in the same manner as in Example B-1 except that EPT-1 and PP-1 were used in a blending ratio by weight of 150/10 (EPT-1/PP-1). The kneading temperature was 145° C.

Then, in a 2.95 liter Banbury mixer (manufactured by Kobe Seikojo K.K.), the resin-EPT blend obtained above, stearic acid, zinc white No. 1, carbon black (trade name: Seast G-116, available from Tokai Carbon Co., Ltd.) and oil (trade name: PW-380, available from Idemitsu Kosan Co., Ltd.) were kneaded in the amounts shown in Table 15 for 5 minutes in a charge ratio of 70%.

Subsequently, an unvulcanized compounded rubber was prepared, and then a vulcanized rubber sheet was prepared, in the same manner as in Comparative Example B-7.

Properties of the unvulcanized compounded rubber and the vulcanized rubber are set forth in Table 15.

Example B-8

The procedure of Example B-7 was repeated except that EPT-1 and PP-1 were used in a blending ratio by weight of 150/20 (EPT-1/PP-1).

The results are set forth in Table 15.

TABLE 15

|  | Comp. Example B-7 | Example B-7 | Example B-8 |
|---|---|---|---|
| <Composition> (part(s) by weight) | | | |
| EPT-1 | 150 | 150 | 150 |
| PP-1 | — | 10 | 20 |
| Stearic acid | 1 | 1 | 1 |
| Zinc white No.1 | 5 | 5 | 5 |
| Seast G-116 *1 | 60 | 50 | 40 |
| PW-380 *2 | 11 | 11 | 11 |
| Sulfur | 0.5 | 0.5 | 0.5 |
| Vulcanization accelerator M | 0.5 | 0.5 | 0.5 |
| Vulcanization accelerator Bz | 1.2 | 1.2 | 1.2 |
| Vulcanization accelerator TT | 1.2 | 1.2 | 1.2 |
| Aspect ratio of PP dispersed particle | — | 1.3 | 1.3 |
| <Properties of unvulcanized rubber composition> | | | |
| $V_mML$ (120° C.) | 68 | 64 | 66 |
| $t_S$ (120° C.) (min) | 26.6 | 30.6 | 36.0 |
| Curast $T_{90}$ (160° C.) (min) | 9.4 | 11.9 | 13.4 |
| <Property in original state> | | | |
| $M_{100}$ (kgf/cm$^2$) | 17 | 16 | 17 |
| $T_B$ (kgf/cm$^2$) | 167 | 150 | 137 |
| $E_B$ (%) | 490 | 490 | 510 |
| $H_S$ (JIS A) | 55 | 55 | 56 |
| <Permanent compression set> | | | |
| 100° C. × 70 hrs. (%) | 30 | 32 | 35 |
| 120° C. × 70 hrs. (%) | 44 | 46 | 48 |
| 150° C. × 70 hrs. (%) | 52 | 51 | 52 |

*1: trade name, available from Tokai Carbon Co., Ltd.
*2: trade name, available from Idemitsu Kosan Co., Ltd.

Examples B-9–B-13

In an extruder previously purged with nitrogen, a resin-EPT blend having an aspect ratio of PP dispersed particle of 1.3 was obtained in the same manner as in Example B-1 except that EPT-3 and PP-2 were used in a blending ratio (EPT-3/PP-2) shown in Table 16. The kneading temperature was 158° C. A ratio of the intrinsic viscosity of the EPT $[\eta]_{EPT}$ as measured in decalin at 135° C. to the intrinsic viscosity of the PP $[\eta]_{PP}$ as measured in decalin at 135° C., $[\eta]_{EPT}/[\eta]_{PP}$, was 1.04.

Then, in a 2.95 liter Banbury mixer (manufactured by Kobe Seikojo K.K.), the resin-EPT blend obtained above, carbon black (trade name: Asahi #50HG, available from Asahi Carbon Co., Ltd.), active zinc white (trade name: AZB-B, available from Inoue Sekkai Kogyoshi K.K.), 1 part by weight of stearic acid, Vesta #20 (trade name, available from Inoue Sekkai Kogyosho K.K.) and Sunflex #2280 (trade name, available from Nippon Oil Co., Ltd.) were kneaded in the amounts shown in Table 16 for 5 minutes in a charge ratio of 70%.

Immediately after the kneading operation, roll processing was performed. That is, to the kneadate obtained above were added sulfur, a vulcanization accelerator M (trade name: Sanceler M, available from Sanshin Kagaku Kogyo K.K.), a vulcanization accelerator MDB (trade name: Sanceler MDB, available from Sanshin Kagaku Kogyo K.K.) and a vulcanization accelerator Bz (trade name: Sanceler Bz, available from Sanshin Kagaku Kogyo K.K.) in the amounts shown in Table 16, and they were kneaded by 8 inch rolls (temperature of front and back rolls: 50° C.) to obtain an unvulcanized compounded rubber.

Subsequently, a vulcanized rubber sheet was prepared in the same manner as in Comparative Example B-7.

Properties of the unvulcanized compounded rubber and the vulcanized rubber are set forth in Table 16.

Comparative Example B-8

The procedure of Example B-9 was repeated except that 50 parts by weight of PP-4 was used in place of 10 parts by weight of PP-2.

The results are set forth in Table 16.

A ratio of the intrinsic viscosity of the EPT $[\eta]_{EPT}$ as measured in decalin at 135° C. to the intrinsic viscosity of the PP $[\eta]_{PP}$ as measured in decalin at 135° C., $[\eta]_{EPT}/[\eta]_{PP}$, was 2.00.

TABLE 16

|  | Example | | | | | Comp. Example |
| --- | --- | --- | --- | --- | --- | --- |
|  | B-9 | B-10 | B-11 | B-12 | B-13 | B-8 |
| <Composition> *1 (part(s) by weight) | | | | | | |
| EPT-3 | 120 | 120 | 120 | 120 | 120 | 120 |
| PP-2 | 10 | 20 | 30 | 40 | 50 | — |
| PP-4 | — | — | — | — | — | 50 |
| Asahi #50HG (carbon black) | 60 | 60 | 60 | 60 | 60 | 60 |
| Aspect ratio of PP dispersed particle | 1.3 | 1.3 | 1.3 | 1.3 | 1.3 | 8.5 |
| <Properties of unvulcanized rubber composition> | | | | | | |
| $V_mML$ (120° C.) | 34 | 37 | 42 | 52 | 62 | 85 |
| $t_5$ (120° C.) (min) | 4.8 | 4.7 | 4.8 | 4.7 | 4.8 | 4.1 |
| Curast $T_{90}$ (160° C.) (min) | 11.0 | 11.1 | 11.3 | 12.2 | 17.3 | 17.1 |
| <Property in original state> | | | | | | |
| $M_{100}$ (kgf/cm$^2$) | 18 | 24 | 30 | 47 | 63 | 83 |
| $T_B$ (kgf/cm$^2$) | 68 | 88 | 89 | 111 | 124 | 145 |
| $E_B$ (%) | 380 | 390 | 360 | 360 | 340 | 360 |
| $H_S$ (JIS A) | 55 | 60 | 65 | 70 | 75 | 83 |
| Y = (0.5 ± 0.2) X + 50 | Appl. | Appl. | Appl. | Appl. | Appl. | Inappl |
| <Permanent compression set> | | | | | | |
| 70° C. × 70 hrs. (%) | 10 | 11 | 14 | 20 | 24 | 43 |
| 100° C. × 70 hrs. (%) | 32 | 33 | 35 | 39 | 43 | 67 |
| 120° C. × 70 hrs. (%) | 53 | 55 | 56 | 58 | 61 | 78 |
| 150° C. × 70 hrs. (%) | 64 | 64 | 67 | 67 | 70 | 85 |

*1 Common compounding ingredients:
Active zinc white AZB-B : 5 parts by weight
Stearic acid : 1 part by weight
Vesta #20 : 5 parts by weight
Sunflex #2280 : 50 parts by weight
Sanceler M : 0.8 part by weight
Sanceler MDB : 1.2 parts by weight
Sanceler Bz : 2.0 parts by weight
Sanceler 22 : 1.0 part by weight
Sulfur : 1.5 parts by weight
Note: Appl. = applicable, Inappl. = inapplicable Examples B-14–B-16

In an extruder previously purged with nitrogen, a resin-EPT blend having an aspect ratio of polymethylpentene dispersed particle of 1.5 was obtained in the same manner as in Example B-1 except that EPT-6 and polymethylpentene (PMP) were used in a blending ratio (EPT-6/PMP) shown in Table 17. The kneading temperature was 152° C. A ratio of the intrinsic viscosity of the EPT $[\eta]_{EPT}$ as measured in decalin at 135° C. to the intrinsic viscosity of the PMP $[\eta]_{TPX}$ as measured in decalin at 135° C., $[\eta]_{EPT}/[\eta]_{TPX}$, was 1.00.

Then, in a 2.95 liter Banbury mixer (manufactured by Kobe Seikojo K.K.), the resin-EPT blend obtained above and oil (trade name: PW-380, available from Idemitsu Kosan Co., Ltd.) were kneaded in the amounts shown in Table 17 for 5 minutes in a charge ratio of 70%.

Immediately after the kneading operation, roll processing was performed. That is, to the kneadate obtained above was added dicumyl peroxide (DCP, concentration: 40%) as a vulcanizing agent in an amount of 6.8 parts by weight based on 100 parts by weight of the kneadate, and they were kneaded by 8 inch rolls (temperature of front and back rolls: 50° C.) to obtain an unvulcanized compounded rubber.

Subsequently, a vulcanized rubber sheet was prepared in the same manner as in Comparative Example B-7.

Properties of the unvulcanized compounded rubber and the vulcanized rubber are set forth in Table 17.

TABLE 17

|  | Example | | |
| --- | --- | --- | --- |
|  | B-14 | B-15 | B-16 |
| <Composition> (part(s) by weight) | | | |
| EPT-6 | 100 | 100 | 100 |
| PMP | 100 | 100 | 20 |
| PW-380 (paraffin oil) | 20 | 40 | 20 |
| Aspect ratio of PP dispersed particle | 1.5 | 1.5 | 1.5 |
| <Properties of unvulcanized rubber composition> | | | |
| $ML_{1+4}$ (100° C.) | 30 | 21 | 9 |
| $t_5$ (125° C.) (min) | 15.3 | 17.5 | 13.1 |
| Curast $T_{90}$ (170° C.) (min) | 5.6 | 6.6 | 4.5 |
| <Property of vulcanized rubber> | | | |
| Vulcanization of 170° C. × 20 min | | | |
| Property in original state | | | |
| $M_{100}$ (kgf/cm$^2$) | 62 | 49 | 20 |
| $T_B$ (kgf/cm$^2$) | 68 | 52 | 61 |
| $E_B$ (%) | 190 | 170 | 340 |
| $H_S$ (JIS A) | 92 | 82 | 53 |
| <Permanent compression set> | | | |
| CS (150° C. × 22 hrs.) (%) | 45 | 40 | 19 |

Example C-1

The compounding ingredients shown in Table 18 were mixed and kneaded in a molten state by a twin-screw extruder (50 mm-diameter twin-screw extruder, L/D: 45, manufactured by Toshiba Kikai K.K.) under the conditions of a preset temperature of 230° C. and a screw rotation number of 200 rpm, to obtain a blend A. The energy consumption in the mixing and kneading process was 0.06 kW·h/kg.

TABLE 18

| Composition of blend A | Amount (part(s) by weight) |
| --- | --- |
| EPT rubber (A component) *1 | 100 |
| Crystalline polypropylene (B component) *2 | 20 |

*1: Ethylene/propylene/5-ethylidene-2-norbornene copolymer rubber
Ethylene/propylene molar ratio: 72/28
Intrinsic viscosity $[\eta]$ (measured in decalin at 135° C.): 1.1 dl/g
Iodine value: 22
*2: Vicat softening point: 150° C.
Intrinsic viscosity $[\eta]$ (measured in decalin 135° C.): 1.1 dl/g A slice of the blend A was dyed with ruthenic acid, and its photograph was taken by a scanning electron microscope (trade name: T330A, manufactured by Japan Electron Optics Laboratory Co., Ltd.) of 10,000 magnification. Measurement of a mean particle diameter of the crystalline polypropylene particles by an image analyzing device (trade name: LA-500, manufactured by PIAS Co.) resulted in 0.8 μm.

Then, to the rubber composition A were added the compounding ingredients shown in Table 19 in the amounts shown in Table 19, and they were kneaded by 14 inch open rolls (manufactured by Nippon Roll K.K.) for 5 minutes, to obtain a blend B. In the kneading operation, the front roll had a surface temperature of 50° C. and the back roll had a surface temperature of 60° C.

TABLE 19

| Compounding ingredient | Amount (part(s) by weight) |
|---|---|
| Blend A | 120 |
| Zinc white *1 | 5 |
| Stearic acid | 2 |
| SRF carbon black *2 | 50 |
| Softener *3 | 40 |

*1: available from Sakai chemical Industry Co., Ltd.
*2: Asahi #50 (trade name), available from Asahi Carbon Co., Ltd.
*1: Diana Process Oil PW380 (trade name), available from Idemitsu Kosan Co., Ltd.

Then, the blend B was wound on 14 inch open rolls (manufactured by Nippon Roll K.K.), and on the open rolls to the blend B were added the compounding ingredients shown in Table 20. The resulting mixture was kneaded for 3 minutes and sheeted to obtain an unvulcanized foamable compounded rubber as a sheet having a thickness of 3 mm. In the kneading operation, the front roll had a surface temperature or 50° C. and the back roll had a surface temperature of 60° C.

TABLE 20

| Compounding ingredient | Amount (part(s) by weight) |
|---|---|
| Blend B | 217 |
| Azo foaming agent *1 | 7.0 |
| Foaming aid *2 | 2.0 |
| Vulcanization accelerator MBT *3 | 0.5 |
| Vulcanization accelerator TMTD *4 | 0.5 |
| Vulcanization accelerator TETD *5 | 0.5 |
| Vulcanization accelerator ZnBDC *6 | 1.5 |
| Sulfur | 1.0 |

*1: AC #3SW (trade name), available from Eiwa Chemical Industry Co., Ltd.
*2: Cellpaste 101W (trade name), available from Eiwa Chemical Industry Co., Ltd.
*3: Sanceler M (trade name), available from Sanshin Kagaku Kogyo K.K.
*4: Sanceler TT (trade name), available from Sanshin Kagaku Kogyo K.K.
*5: Sanceler TET (trade name), available from Sanshin Kagaku Kogyo K.K.
*6: Nocceler Bz (trade name), available from Ouchi-Shinko Chemical Industry Co., Ltd.

Figure 2A:
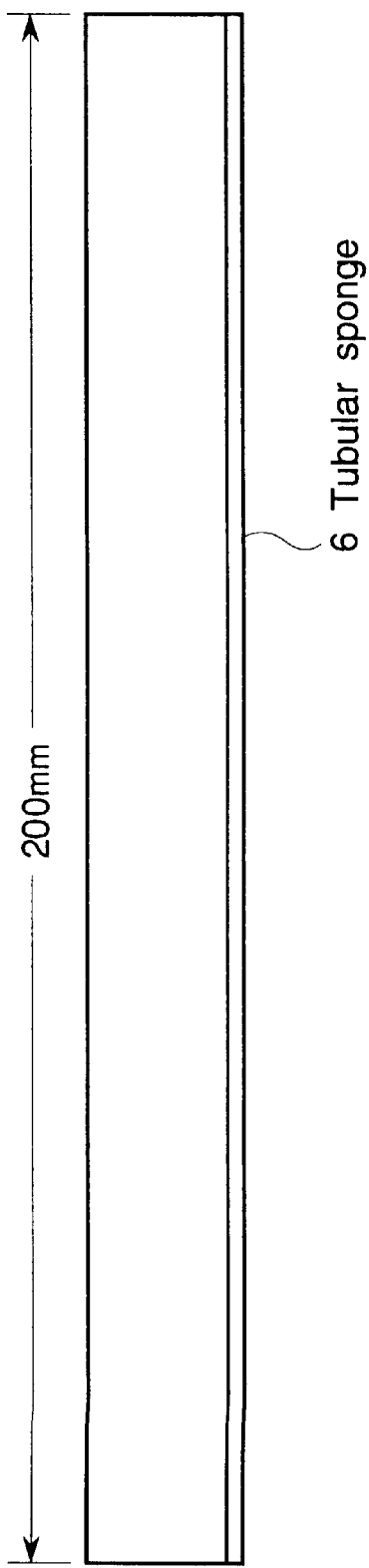
FIG. 2A is a plan of a tubular sponge used for a performance test in the examples.
Figure 2B:
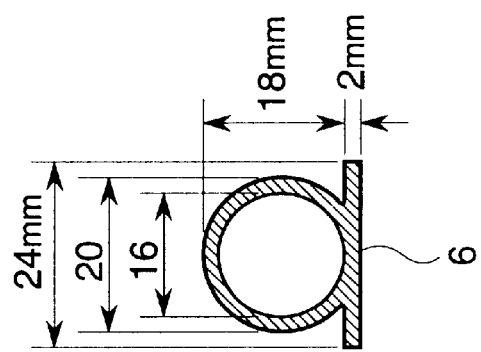
FIG. 2B is a transverse sectional view of the tubular sponge.

The foamable compounded rubber was introduced into a mold of a transfer molding machine (manufactured by Kitajyuji K.K.) over a period of 10 seconds, and it was vulcanized and foamed at a mold temperature of 180° C. for 3.5 minutes to obtain a tubular sponge 6 shown in FIG. 2. This foamed product was measured on specific gravity, water absorption, tensile strength and permanent compression set, which are basic properties of foamed products. Further, flowability of the foamable compounded rubber was evaluated.

The results are set forth in Table 28.

The above properties were measured by the following methods.

Measurement of Specific Gravity

A specimen having a length of 20 mm was punched from the vulcanized tubular sponge 6 of FIG. 2, and the surface of the specimen was wiped with alcohol to remove stain. The specimen was mounted on an automatic specific gravity hydrometer (Model M-1, manufactured by Toyo Seiki Seisakusho K.K.) in an atmosphere of 25° C. From a difference between mass of the specimen in air and that in pure water, the specific gravity was determined.

Measurement of Water Absorption

A specimen having a length of 20 mm was punched from the vulcanized tubular sponge 6 of FIG. 2, and a weight of the specimen was measured. Separately, water was introduced into a desiccator equipped with a suction opening until the surface of water reached a height of at least 100 mm from the bottom of the desiccator, and the specimen was placed therein. In order to prevent float-up of the specimen, it was sunk in the water by means of a wire mesh. Then, the pressure in the desiccator was reduced by a vacuum pump and maintained at 635 mmHg. After 3 minutes, reducing the pressure in the desiccator was stopped, followed by keeping the desiccator as it was for another 3 minutes. Then, the specimen was taken out, wiped to remove water drops on the surface and weighed. The water absorption was calculated by the following equation.

$$\text{Water absorption } (\%) = ((W2 - W1) \times 100)/W1$$

W1: weight (g) of specimen before immersion in water
W2: weight (g) of specimen after immersion in water

Tensile Test

A dumbbell specimen of No. 3 described in JIS K 6301 (1989) was punched from the vulcanized tubular sponge 6 of FIG. 2. The specimen was subjected to a tensile test in accordance with a method defined by JIS K 6301 under the conditions of a measuring temperature of 25° C. and a stress rate of 500 mm/min, to measure a tensile stress at break $T_B$ and a tensile elongation at break $E_B$.

Permanent Compression Set Test

The vulcanized tubular sponge of FIG. 2 was cut to give a specimen having a length of 30 mm, and the specimen was mounted on a permanent compression set measuring mold. The specimen was compressed under load so that the height of the specimen became ½ as much as the previous height. Then, the specimen with the mold was placed in a Geer oven at 70° C. and heat-treated for 200 hours. After cooling over 30 minutes, a height of the specimen was measured, and the permanent compression set was calculated by the following equation.

$$\text{Permanent compression set } (\%) = \{(t_0 - t_1) \times 100\}/(t_0 - t_2)$$

$t_0$: height of specimen before test
$t_1$: height of specimen after heat treatment and 30-minute cooling
$t_2$: height of specimen in a state where the specimen is mounted on measuring mold

Flowability Evaluation Test

The foamable compounded rubber of 10 g was introduced into a mold of the above-mentioned transfer molding machine (manufactured by Kitajyuji K.K.) over a period of 10 seconds, and was vulcanized at a mold temperature of 180° C. for 3.5 minutes to obtain a molded product 7 shown in FIG. 3. The molded product was then allowed to be spontaneously foamed. Thereafter, a length (L in FIG. 3) of the foamed product was measured.

Comparative Example C-1

The procedure of Example C-1 was repeated except that the EPT rubber was used without addition of the crystalline polypropylene and the formulations shown in Tables 19 and 20 were varied to those shown in Tables 21 and 22, respectively. The results are set forth in Table 28.

TABLE 21

| Compounding ingredient | Amount (part(s) by weight) |
|---|---|
| Blend A | 100 |
| Zinc white *1 | 5 |
| Stearic acid | 2 |
| SRF carbon black *2 | 50 |
| Softener *3 | 40 |

*1–*3: See. Table 19

TABLE 22

| Compounding ingredient | Amount (part(s) by weight) |
|---|---|
| Blend B | 197 |
| Azo foaming agent *1 | 7.0 |
| Foaming aid *2 | 2.0 |
| Vulcanization accelerator MBT *3 | 0.5 |
| Vulcanization accelerator TMTD *4 | 0.5 |
| Vulcanization accelerator TETD *5 | 0.5 |
| Vulcanization accelerator ZnBDC *6 | 1.5 |
| Sulfur | 1.0 |

*1–*6: See. Table 20

Comparative Example C-2

The procedure of Example C-1 was repeated except that the EPT rubber was used without addition of the crystalline polypropylene and the formulation shown in Table 19 was varied to that shown in Table 23. The results are set forth in Table 28.

TABLE 23

| Compounding ingredient | Amount (part(s) by weight) |
|---|---|
| Blend A | 100 |
| Zinc white *1 | 5 |
| Stearic acid | 2 |
| SRF carbon black *2 | 50 |
| FEF carbon black *4 | 20 |
| Softener *3 | 40 |

*1–*3: See. Table 19
*4: Asahi #60 (trade name), available from Asahi Carbon Co., Ltd.

Comparative Example C-3

The procedure of Example C-1 was repeated except that crystalline polyethylene (Vicat softening point: 114° C.) was used in place of the crystalline polypropylene. The energy consumption in the mixing and kneading process was 0.07 kW·h/kg. The results are set forth in Table 28.

Example C-2

The procedure of Example C-1 was repeated except that the amount of the crystalline polypropylene was varied to 10 parts by weight from 20 parts by weight and the formulations shown in Tables 19 and 20 were varied to those shown in Tables 24 and 25, respectively. The energy consumption in the mixing and kneading process was 0.06 kW·h/kg. The results are set forth in Table 28.

TABLE 24

| Compounding ingredient | Amount (part(s) by weight) |
|---|---|
| Blend A | 110 |
| Zinc white *1 | 5 |
| Stearic acid | 2 |
| SRF carbon black *2 | 50 |
| Softener *3 | 40 |

*1–*3: See. Table 19

TABLE 25

| Compounding ingredient | Amount (part(s) by weight) |
|---|---|
| Blend B | 207 |
| Azo foaming agent *1 | 7.0 |
| Foaming aid *2 | 2.0 |
| Vulcanization accelerator MBT *3 | 0.5 |
| Vulcanization accelerator TMTD *4 | 0.5 |
| Vulcanization accelerator TETD *5 | 0.5 |
| Vulcanization accelerator ZnBDC *6 | 1.5 |
| Sulfur | 1.0 |

*1–*6: See. Table 20

Example C-3

The procedure of Example C-1 was repeated except that the amount of the crystalline polypropylene was varied to 30 parts by weight from 20 parts by weight and the formulations shown in Tables 19 and 20 were varied to those shown in Tables 26 and 27, respectively. The energy consumption in the mixing and kneading process was 0.06 kW·h/kg. The results are set forth in Table 29.

TABLE 26

| Compounding ingredient | Amount (part(s) by weight) |
|---|---|
| Blend A | 130 |
| Zinc white *1 | 5 |
| Stearic acid | 2 |
| SRF carbon black *2 | 50 |
| Softener *3 | 40 |

*1–*3: See. Table 19

TABLE 27

| Compounding ingredient | Amount (part(s) by weight) |
|---|---|
| Blend B | 227 |
| Azo foaming agent *1 | 7.0 |
| Foaming aid *2 | 2.0 |
| Vulcanization accelerator MBT *3 | 0.5 |
| Vulcanization accelerator TMTD *4 | 0.5 |
| Vulcanization accelerator TETD *5 | 0.5 |
| Vulcanization accelerator ZnBDC *6 | 1.5 |
| Sulfur | 1.0 |

*1–*6: See. Table 20

Comparative Example C-4

The procedure of Example C-1 was repeated except that the mixing and kneading operation of the crystalline polypropylene with the EPT rubber was performed in a 1.7 liter Banbury mixer (trade name: BR, manufactured by Kobe Seikojo K.K.) for 2 minutes with introducing steam of 6 kg/cm². The kneading temperature was 150° C., and the energy consumption was 0.005 kW·h/kg. The mean particle diameter of the dispersed particles was 70 μm. The results are set forth in Table 29.

Comparative Example C-5

In the procedure of Example c-1, the mixing and kneading operation of the crystalline polypropylene with the EPT rubber was performed in a 1.7 liter Banbury mixer (trade name: BR, manufactured by Kobe Seikojo K.K.) for 1 minutes with introducing steam of 6 kg/cm². The kneading temperature was 130° C., and the energy consumption was 0.003 kW·h/kg. The winding of the kneadate to the rolls was impossible, and the subsequent operation was unable to be performed.

Comparative Example C-6

In the procedure of Example C-1, the amount of the crystalline polypropylene was varied to 100 parts by weight from 20 parts by weight. However, the kneadate was so hard that the subsequent operation was unable to be performed.

Example C-4

The procedure of Example C-1 was repeated except that the amount of the foaming agent was varied to 15 parts by weight from 7 parts by weight. The results are set forth in Table 29.

TABLE 28

|  | Example C-1 | Comp. Ex. C-1 | Comp. Ex. C-2 | Comp. Ex. C-3 | Example C-2 |
|---|---|---|---|---|---|
| <Composition> (part(s) by weight) | | | | | |
| EPT rubber | 100 | 100 | 100 | 100 | 100 |
| Crystalline polyolefin resin | 20 | — | — | 20 | 10 |
| Foaming agent | 7 | 7 | 7 | 7 | 7 |
| Crystalline polyolefin resin | | | | | |
| Vicat softening point (° C.) | 150 | — | — | 114 | 150 |
| Mean dispersed particle diameter (μm) | 0.8 | — | — | <0.1 | 0.7 |
| Aspect ratio | 1.2 | — | — | — | 1.2 |
| Property of sponge | | | | | |
| Specific gravity | 0.57 | 0.60 | 0.92 | 0.58 | 0.58 |
| Water absorption (%) | 20 | 22 | 8 | 18 | 20 |
| Tensile test | | | | | |
| $T_B$ (kgf/cm²) | 31 | 20 | 38 | 27 | 26 |
| $E_B$ (%) | 380 | 300 | 350 | 410 | 350 |
| Permanent compression set (%) | 37 | 38 | 41 | 54 | 39 |
| Flowability Length of molded product (mm) | 150 | 140 | 88 | 150 | 147 |

TABLE 29

|  | Example C-3 | Comp. Ex. C-4 | Comp. Ex. C-5 | Comp. Ex. C-6 | Example C-4 |
|---|---|---|---|---|---|
| <Composition> (part(s) by weight) | | | | | |
| EPT rubber | 100 | 100 | 100 | 100 | 100 |
| Crystalline polyolefin resin | 30 | 20 | 20 | 100 | 20 |
| Foaming agent | 7 | 7 | 7 | 7 | 15 |
| Crystalline polyolefin resin | | | | | |
| Vicat softening point (° C.) | 150 | 150 | 150 | 150 | 150 |
| Mean dispersed particle diameter (μm) | 0.8 | 70 | unmeasurable | unmeasurable | 0.8 |
| Aspect ratio | 1.2 | — | unmeasurable | unmeasurable | 1.2 |
| Property of sponge | | | | | |
| Specific gravity | 0.56 | 0.59 | — | — | 0.49 |
| Water absorption (%) | 18 | 23 | — | — | 27 |
| Tensile test | | | | | |
| $T_B$ (kgf/cm²) | 34 | 12 | — | — | 16 |
| $E_B$ (%) | 400 | 180 | — | — | 340 |
| Permanent compression set (%) | 38 | 42 | — | — | 35 |
| Flowability Length of molded product (mm) | 155 | 142 | — | — | 171 |

Example C-5

The procedure of Example C-1 was repeated except that the compounding ingredients shown in Table 18 were replaced with those shown in Table 30, and the formulation shown in Table 19 was replaced with that shown in Table 31, and the formulation shown in Table 20 was replaced with that shown in Table 32. The energy consumption in the mixing and kneading process was 0.13 kW·h/kg, and the mean particle diameter of the crystalline polypropylene particles was 0.5 μm.

TABLE 30

| Compounding ingredient | Amount (part(s) by weight) |
| --- | --- |
| EPT rubber (A component) *1 | 100 |
| Crystalline polypropylene rubber *2 | 20 |

*1: Ethylene/α-olefin/5-ethylidene-2-norbornene copolymer rubber
Ethylene/propylene molar ratio: 66/34
Intrinsic viscosity [η] (measured in decalin at 135° C.): 2.3 dl/g
Iodine value: 22
*2: Vicat softening point: 150° C.

TABLE 31

| Compounding ingredient | Amount (part(s) by weight) |
| --- | --- |
| Blend A | 120 |
| Zinc white *1 | 5 |
| Stearic acid | 2 |
| SRF carbon black *2 | 60 |
| Ground limestone *3 | 50 |
| Softener *4 | 50 |
| Processing aid-1 *5 | 2 |
| Processing aid-2 *6 | 5 |

*1: available from Sakai Chemical Industry Co., Ltd.
*2: Asahi #50 (trade name), available from Asahi Carbon Co., Ltd.
*3: Whiton SB (trade name), available from Shiraishi Calcium Kaisha, Ltd.
*4: Diana Process Oil PW380 (trade name), available from Idemitsu Kosan Co., Ltd.
*5: Emaster 510P (trade name), available from Riken Vitamin Co., Ltd.
*6: Vesta PP (trade name), available from Inoue Sekkai Kogyosho K.K.

TABLE 32

| Compounding ingredient | Amount (part(s) by weight) |
| --- | --- |
| Blend B | 274 |
| Foaming agent *1 | 3.0 |
| Vulcanization accelerator MBT *2 | 1.0 |
| Vulcanization accelerator ZnBDC *3 | 1.0 |
| Vulcanization accelerator EU *4 | 0.5 |
| Vulcanization accelerator TETD *5 | 0.8 |
| Sulfur | 1.0 |

*1: Neocellborn N1000SW (trade name), available from Eiwa Chemical Industry Co., Ltd.
*2: Sanceler M (trade name), available from Sanshin Kagaku Kogyo K.K.
*3: Sanceler BZ (trade name), available from Sanshin Kagaku Kogyo K.K.
*4: Sanceler 22 (trade name), available from Sanshin Kagaku Kogyo K.K.
*5: Sanceler TET (trade name), available from Sanshin Kagaku Kogyo K.K.

Then, the resulting blend was extrusion molded by an extruder (diameter: 60 mm) having been adjusted to have a die temperature of 60° C., a barrel temperature of 60° C. and a screw temperature of 40° C., to prepare a molded product. The molded product was continuously fed to a hot air bath preset at 220° C. and heated therein for 5 minutes to perform vulcanization and foaming. A transverse section of the die 8 used for preparing the molded product is shown in FIG. 4. Properties of the sponge (foamed product) are set forth in Table 33.

TABLE 33

| | Example C-5 |
| --- | --- |
| <Composition> (part(s) by weight) | |
| EPT rubber | 100 |
| Crystalline polyolefin resin | 20 |
| Foaming agent | 3.0 |
| Crystalline polyolefin resin | |
| Vicat softening point (° C.) | 150 |
| Mean dispersed particle diameter (μm) | 0.5 |
| Aspect ratio of dispersed particle | 1.2 |
| Property of sponge | |
| Specific gravity | 0.51 |
| Water absorption (%) | 5 |
| Tensile test | |
| $T_B$ (kgf/cm$^2$) | 31 |
| $E_B$ (%) | 350 |
| Permanent compression set (%) | 20 |

Example D-1

A solution of an ethylene/propylene/5-ethylidene-2-norbornene copolymer rubber (ethylene content: 73% by mol, iodine value; 12, Mooney viscosity ($ML_{1+4}(100°$ C.)): 110) prepared by a conventionally known solution polymerization process was adjusted to have a hexane solvent content of 7 parts by weight based on 100 parts by weight of the rubber, to obtain a rubber composition containing a hexane solvent.

The rubber composition was fed to a twin-screw three-stage vented extruder at a feed rate of 1,667 kg/hr, while pellets of a polyethylene resin (ethylene homopolymer, density: 0.921 g/cm$^3$, MFR (ASTM D 1238, 190° C. 2.14 kg): 1.6 g/10 min) were fed to the extruder at a feed rate of 333 kg/hr through a polyolefin resin feed zone of the extruder, thereby to perform kneading of the ethylene/propylene/5-ethylidene-2-norbornene copolymer rubber and the polyethylene resin and desolvating. The resulting rubber was cut into pellets at the end of the extruder to obtain pellets of an ethylene type copolymer rubber composition at a rate of 2,000 kg/hr.

A blending ratio by weight of the polyethylene resin to the ethylene/propylene/5-ethylidene-2-norbornene copolymer rubber in the ethylene type copolymer rubber composition was 20/100.

Comparative Example D-1

A solution of an ethylene/propylene/5-ethylidene-2-norbornene copolymer rubber (ethylene content: 73% by mol, iodine value: 12, Mooney viscosity ($ML_{1+4}(100°$ C.)): 110) prepared by a solution polymerization process was adjusted to have a hexane solvent content of 7 parts by weight based on 100 parts by weight of the rubber, to obtain a rubber composition containing a hexane solvent.

The rubber composition was fed to a twin-screw three-stage vented extruder and the solvent was removed from the composition. The resulting rubber was cut into pellets at the end of the extruder to obtain pellets of the ethylene/propylene/5-ethylidene-2-norbornene copolymer rubber at a rate of 2,000 kg/hr.

Then, 100 parts by weight of the ethylene/propylene/5-ethylidene-2-norbornene copolymer rubber pellets and 20 parts by weight of the polyethylene resin pellets used in Example D-1 were kneaded and granulated by an extruder, to obtain pellets of an ethylene type copolymer rubber composition.

In the above-mentioned kneading procedure, the ethylene/propylene/5-ethylidene-2-norbornene copolymer rubber pellets were seriously adhered to each other, so that they had to be separated from each other prior to feeding to the extruder.

Example D-2

Pellets of an ethylene type copolymer rubber composition composed of an ethylene/propylene/5-ethylidene-2-norbornene copolymer rubber and a polypropylene resin were obtained at a rate of 2,000 kg/hr in the same manner as in Example D-1, except that pellets of a polypropylene resin having MFR (230° C., 2.16 kg) of 11 g/10 min and a density of 0.91 g/cm$^3$ were used in place of the polyethylene resin pellets.

A blending ratio by weight of the polypropylene resin to the ethylene/propylene/5-ethylidene-2-norbornene copolymer rubber in the ethylene copolymer rubber composition was 20/100.

The ethylene type copolymer rubber composition obtained above was subjected to a pellet blocking test.

That is, the ethylene type copolymer rubber composition pellets of 300 g were placed in a frame having a bottom area of 10 cm×10 cm and a height of 10 cm. On the pellets was then placed a flat plate of 10 cm×10 cm, and a load was further applied so that the whole load including the flat plate became 100 g/cm$^2$. Then, the pellets were allowed to stand at 40° C. for 72 hours. After the temperature was returned to room temperature, the frame was removed. Then, blocking tendency of the pellets was evaluated based on the following criteria.

EVALUATION

5: Pellet blocking is not observed at all.

4: A lump of a composition easily and completely crumbles into pellets by touching it with finger.

3: A lump of a composition crumbles into pellets by touching it with finger, but some agglomerates are observed.

2: A lump of a composition crumbles into pellets by strongly pushing it with hand, but some agglomerates are observed.

1: A composition almost in the form of bale is observed.

The ethylene copolymer rubber composition obtained in Example D-2 was ranked as 4, and the composition was able to be easily handled as pellets.

Example D-3

Pellets of an ethylene type copolymer rubber composition composed of an ethylene/propylene/5-ethylidene-2-norbornene copolymer rubber and a polypropylene resin were obtained in the same manner as in Example D-2, except that an ethylene/propylene/5-ethylidene-2-norbornene copolymer rubber having an ethylene content of 63%, iodine value of 22 and a Mooney viscosity (ML$_{1+4}$ (100° C.)) of 30 was used in place of the ethylene/propylene/5-ethylidene-2-norbornene copolymer rubber of Example D-2.

A blending ratio by weight of the polypropylene resin and the ethylene/propylene/5-ethylidene-2-norbornene copolymer rubber in the ethylene type copolymer rubber composition was 30/100.

The ethylene type copolymer rubber composition obtained above was subjected to the same pellet blocking test as described above.

As a result, the ethylene type copolymer rubber composition was ranked as 4, and the composition was able to be easily handled as pellets.

What is claimed is:

1. A rubber composition comprising:

an ethylene/α-olefin/nonconjugated polyene copolymer rubber (A) which comprises ethylene, an α-olefin of 3 to 20 carbon atoms and a nonconjugated polyene; and a polyolefin resin (B) which is an ethylene homopolymer or a crystalline ethylene/α-olefin copolymer, wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm; and a blending ratio by weight of the polyolefin resin (B) to the ethylene/α-olefin/nonconjugated polyene copolymer rubber (A), ((B)/(A)), is in the range of 5/95 to 50/50.

2. A rubber composition comprising an ethylene/α-olefin/nonconjugated polyene copolymer rubber (A) which comprises ethylene, an α-olefin of 3 to 20 carbon atoms and a nonconjugated polyene; and a polyolefin resin (B) which is a crystalline α-olefin homopolymer of an α-olefin of 3 to 8 carbon atoms or a crystalline α-olefin copolymer of the α-olefins, wherein:

the rubber composition is a blend obtained by microdispersing the polyolefin resin (B) in the ethylene/α-olefin/nonconjugated polyene copolymer rubber (A) in a molten state;

the polyolefin resin (B) has a mean dispersed particle diameter of not more than 2 μm;

a blending ratio by weight of the polyolefin resin (B) to the ethylene/α-olefin/nonconjugated polyene copolymer rubber (A), ((B)/(A)), is in the range of 5/95 to 50/50; and the hardness (Y, A hardness defined by JIS K 6301) of the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

3. The rubber composition as claimed in claim 2, wherein the dispersed particles of the polyolefin resin (B) have an aspect ratio of not more than 5.

4. The rubber composition as claimed in claim 2, comprising:

an ethylene/α-olefin/nonconjugated polyene copolymer rubber (A) which comprises ethylene, an α-olefin of 3 to 20 carbon atoms and a nonconjugated polyene;

a polyolefin resin (B) which is a crystalline α-olefin homopolymer of an α-olefin of 3 to 8 carbon atoms or a crystalline α-olefin copolymer of the α-olefins and has a Vicat softening point of not lower than 130° C.; and a foaming agent (C), wherein:
- the rubber composition is a blend obtained by microdispersing the polyolefin resin (B) in the ethylene/α-olefin/nonconjugated polyene copolymer rubber (A) in a molten state;
- the polyolefin resin (B) has a mean dispersed particle diameter of not more than 2 μm;
- a blending ratio by weight of the polyolefin resin (B) to the ethylene/α-olefin/nonconjugated polyene copolymer rubber (A), ((B)/(A)), is in the range of 5/95 to 50/50;
- a blending ratio by weight of the foaming agent (C) to the ethylene/α-olefin/nonconjugated polyene copolymer rubber (A), ((C)/(A)), is in the range of 0.5/100 to 30/100; and
- the hardness (Y, a hardness defined by JIS K 6301) of the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

5. The rubber composition as claimed in claim 2, comprising:
- an ethylene/α-olefin/nonconjugated polyene copolymer rubber (A) which comprises ethylene, an α-olefin of 3 to 20 carbon atoms and a nonconjugated polyene; and
- a polyolefin resin (B) which is a crystalline α-olefin homopolymer of an α-olefin of 3 to 8 carbon atoms or a crystalline α-olefin of the α-olefins, wherein:
- the rubber composition is a blend obtained by microdispersing the polyolefin resin (B) in the ethylene/α-olefin/nonconjugated polyene copolymer rubber (A) in a molten state;
- the polyolefin resin (B) has a mean dispersed particle diameter of not more than 2 μm;
- a blending ratio by weight of the polyolefin resin (B) to the ethylene/α-olefin/nonconjugated polyene copolymer rubber (A), ((B)/(A)), is in the range of 5/95 to 50/50; and
- the hardness (Y, A hardness defined by JIS K 6301) of a non-foamed vulcanized rubber molded product obtained by vulcanizing the rubber composition and the amount (X) of the polyolefin resin (B) satisfy the following relation:

$$Y=(0.5\pm0.2)X+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the molded product.

6. The rubber composition as claimed in claim 5, wherein the dispersed particles of the polyolefin resin (B) have an aspect ratio of not more than 5.

7. A process for preparing rubber composition comprising:
- feeding a rubber mixture (E) which comprises 100 parts by weight of an ethylene/α-olefin/nonconjugated polyene copolymer rubber (A) comprising ethylene, an α-olefin of 3 to 20 carbon atoms and a nonconjugated polyene and 3 to 10 parts by weight of an organic solvent (D) to a multi-stage vented extruder through its feed zone;
- feeding a polyolefin resin (B) to the extruder through another feed zone in an inert gas atmosphere; and
- kneading the rubber mixture (E) and the polyolefin resin (B) and desolvating.

8. The process for preparing rubber composition as claimed in claim 7, wherein a blending ratio by weight of the polyolefin resin (B) to the ethylene/α-olefin/nonconjugated polyene copolymer rubber (A) in the rubber composition ((B)/(A)), is in the range of 5/95 to 50/50.

9. A rubber composition comprising:
- an ethylene/α-olefin/nonconjugated polyene copolymer rubber (A) which comprises ethylene, an α-olefin of 3 to 20 carbon atoms and a nonconjugated polyene; and
- a polyolefin resin (B) which is a crystalline α-olefin homopolymer of an α-olefin of 3 to 8 carbon atoms or a crystalline α-olefin copolymer of the α-olefins, wherein:
- the rubber composition is a blend obtained by microdispersing the polyolefin resin (B) in the ethylene/α-olefin/nonconjugated polyene copolymer rubber (A) in a molten state;
- the polyolefin resin (B) has a mean dispersed particle diameter of not more than 2 μm;
- a blending ratio by weight of the polyolefin resin (B) to the ethylene/α-olefin/nonconjugated polyene copolymer rubber (A), ((B)/(A)), is in the range of 10/90 to 29/71; and
- the hardness (Y, A hardness defined by JIS K 6301) of the rubber composition and the amount (X) of the polyolefin resin (B) satisfy the following relation:

$$Y=(0.5\pm0.2)x+a$$

wherein X is an amount (by weight) of the polyolefin resin (B) (total amount of the components (A) and (B): 100 parts by weight), and a is a hardness obtained by subtracting an increase of hardness given by blending the polyolefin resin (B) from the hardness of the rubber composition.

10. The rubber composition as claimed in claim 9, wherein the polyolefin resin (B) is an ethylene homopolymer or a crystalline ethylene/α-olefin copolymer.

11. The rubber composition as claimed in claim 9, wherein the dispersed particles of the polyolefin resin (B) have an aspect ratio of not more than 5.

12. A process for preparing rubber composition comprising:
- feeding a rubber mixture (E) which comprises 100 parts by weight of an ethylene/α-olefin/nonconjugated polyene copolymer rubber (A) comprising ethylene, an α-olefin of 3 to 20 carbon atoms and a nonconjugated polyene and 3 to 10 parts by weight of an organic solvent (D) to a multi-stage vented extruder through its feed zone;
- feeding a polyolefin resin (B) having a mean dispersed particle diameter of not more than 2 μm to the extruder through another feed zone in an inert gas atmosphere, wherein a blending ratio by weight of the polyolefin resin (B) to the ethylene/α-olefin/nonconjugated polyene copolymer rubber (A), ((B)/(A)), is in the range of 5/95 to 50/50; and
- kneading the rubber mixture (E) and the polyolefin resin (B) and desolvating.

* * * * *